US 008990112B2

(12) United States Patent
Nuggehalli

(10) Patent No.: US 8,990,112 B2
(45) Date of Patent: Mar. 24, 2015

(54) EXPENSE REPORT SYSTEM WITH RECEIPT IMAGE PROCESSING

(75) Inventor: Jayasimha Nuggehalli, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/523,732

(22) Filed: Jun. 14, 2012

(65) Prior Publication Data
US 2013/0230246 A1 Sep. 5, 2013

Related U.S. Application Data

(63) Continuation-in-part of application No. 13/410,170, filed on Mar. 1, 2012.

(51) Int. Cl.
G07B 17/00 (2006.01)
G07F 19/00 (2006.01)
G06Q 10/00 (2012.01)
G06K 7/10 (2006.01)

(52) U.S. Cl.
USPC ............................... 705/30; 705/1.1; 382/321

(58) Field of Classification Search
None
See application file for complete search history.

(56) References Cited

U.S. PATENT DOCUMENTS

| 5,689,620 | A | 11/1997 | Kopec et al. | |
|---|---|---|---|---|
| 5,910,988 | A | 6/1999 | Ballard | |
| 6,353,840 | B2* | 3/2002 | Saito et al. | 715/202 |
| 6,886,136 | B1* | 4/2005 | Zlotnick et al. | 715/780 |
| 6,918,038 | B1 | 7/2005 | Smith et al. | |
| 6,991,158 | B2 | 1/2006 | Munte | |
| 7,069,240 | B2* | 6/2006 | Spero et al. | 705/30 |
| 7,437,330 | B1 | 10/2008 | Robinson et al. | |
| 8,014,604 | B2 | 9/2011 | Tzadok et al. | |
| 8,131,798 | B2* | 3/2012 | Mori | 709/202 |
| 8,150,156 | B2* | 4/2012 | Geva et al. | 382/175 |
| 2004/0083134 | A1 | 4/2004 | Spero et al. | |
| 2005/0222944 | A1 | 10/2005 | Dodson, Jr. et al. | |
| 2007/0124803 | A1 | 5/2007 | Taraz | |

(Continued)

FOREIGN PATENT DOCUMENTS

| EP | 1206 117 A2 | 5/2002 |
|---|---|---|
| JP | 2011/237840 A | 11/2011 |
| WO | WO 2004/111896 A1 | 12/2004 |

OTHER PUBLICATIONS

Gutev, Stanislav, "Information Extraction from Images of Shopping Receipts", Master of Science of Informatics University of Edinburg, dated 2011, 54 pages.

(Continued)

*Primary Examiner* — Asfand Sheikh
(74) *Attorney, Agent, or Firm* — Hickman Palermo Truong Becker Bingham Wong LLP

(57) ABSTRACT

A system and method for capturing image data is disclosed. A receipt image processing service selects from a repository a template that guides data capture of receipt data from a receipt image and presents the template to a user on an image capture device. A user previews the receipt image and the selected template. If the user decides that the template does not correctly indicate locations of data areas for data items in the receipt image, then the user either updates an existing template or creates a new template that correctly indicates the location of selected data areas in the receipt image. The selected template, the updated template, or the new template is then used to extract receipt data from the receipt image. The receipt data and receipt image data are then provided to the expense report system.

20 Claims, 28 Drawing Sheets

(56) References Cited

U.S. PATENT DOCUMENTS

| | | | |
|---|---|---|---|
| 2007/0143674 A1* | 6/2007 | Daos et al. | 715/530 |
| 2008/0098432 A1* | 4/2008 | Hardacker et al. | 725/51 |
| 2009/0119574 A1* | 5/2009 | Gitlin et al. | 715/209 |
| 2010/0177343 A1* | 7/2010 | Shapiro et al. | 358/1.15 |
| 2010/0299763 A1 | 11/2010 | Marcus et al. | |
| 2010/0302604 A1* | 12/2010 | Kodimer et al. | 358/474 |
| 2010/0306168 A1* | 12/2010 | Ostad et al. | 707/603 |
| 2012/0047052 A1 | 2/2012 | Patel | |
| 2012/0072280 A1* | 3/2012 | Lin | 705/14.45 |
| 2012/0185368 A1 | 7/2012 | Schloter et al. | |
| 2013/0129218 A1 | 5/2013 | Barrett et al. | |
| 2013/0230205 A1 | 9/2013 | Nuggehalli | |
| 2013/0232040 A1 | 9/2013 | Nuggehalli | |
| 2013/0232041 A1 | 9/2013 | Nuggehalli | |

OTHER PUBLICATIONS

European Patent Office, "Search Report" in application No. 13156695.2—1958, dated May 28, 2013, 8 pages.

European Patent Office, "Search Report" in application No. 13169739.3—1958, dated Nov. 27, 2013, 13 pages.

* cited by examiner

EXPENSE REPORT SYSTEM WITH RECEIPT IMAGE PROCESSING

CROSS-REFERENCE TO RELATED APPLICATIONS

This application is a continuation-in-part and claims the benefit of prior U.S. application Ser. No. 13/410,170, filed on Mar. 1, 2012 and titled "Expense Reporting System With Receipt Image Processing," which application is incorporated by reference in its entirely into the present application.

FIELD OF INVENTION

An embodiment relates to a system and method for managing expense data for expense reports.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Currently, accounting for business expenditures is a painstaking and time-consuming activity. The receipts relating to an expenditure are manually collected, itemized, and entered into a form. The receipt is then manually reconciled with any credit card information available from a credit card service that processed a credit card used in the making the expenditure. If a person made the expenditure with a personal credit card, then a credit card statement for the expenditure has to be collected from the person using the credit card. If the person made the expenditure with cash, then there is no credit card data with which to reconcile the receipt. Not only do the above activities take time, but they also delay reimbursement to the person making the expenditure.

Additionally, receipts from purchase transactions come in various sizes and formats. Because of these different sizes and formats, submitting these receipts to an OCR engine for data capture may not always yield accurate data. When the captured data is presented to a user for verification, the user has to take additional time to correct and incorrect or missing data.

SUMMARY

One embodiment is a method for generating expense data for an expense report. The method includes receiving receipt data that includes one or more data items pertaining to a transaction, where the one or more data items are obtained from characters optically recognized in receipt image data for the transaction, and the receipt data includes data indicating that the transaction is a credit card transaction, and creating expense data for the expense report, where the expense data includes the receipt data and the receipt image data associated with the receipt data for the transaction, and the receipt data includes credit card data.

Another embodiment is a method for capture of image data. The method includes (i) receiving receipt image data from an image capture device, where the receipt image data has a particular layout of data items, (ii) selecting a template from a plurality of templates, where the selected template has a layout of data areas corresponding to the particular layout of data items in the receipt image data, (iii) transferring the selected template to the image capture device, (iv) obtaining a data extraction template from the image capture device in response to transferring the selected template, and (v) extracting receipt data from the receipt image data in accordance with the extraction template.

Embodiments may be implemented by instructions processed by one or more processors, by one or more computer-implemented methods, or by devices or apparatuses configured accordingly.

DETAILED DESCRIPTION

In the following description, for the purposes of explanation, numerous specific details are set forth in order to provide a thorough understanding. It will be apparent, however, that embodiments may be practiced without these specific details. In other instances, well-known structures and devices are depicted in block diagram form in order to avoid unnecessarily obscuring the embodiments.

General Overview

An embodiment obtains data from a receipt and matches the data with credit card information, if the transaction recorded on the receipt is a credit card transaction. An expense report is generated based the receipt data and the credit card transaction data. In the description that follows, it is understood that while the term "credit card" is used for purposes of explanation, the term includes, without limitation any form of payment that involves the use of crediting or debiting of an account and is not limited to credit, debit, or ATM cards. For example, the approach is applicable to transactions involving the use of credit cards, debit cards and ATM cards, as well as transactions that are performed using wireless communications, for example, via mobile devices, PDAs, cell phones, tablet computers, laptop computers, etc.

Figure 1:
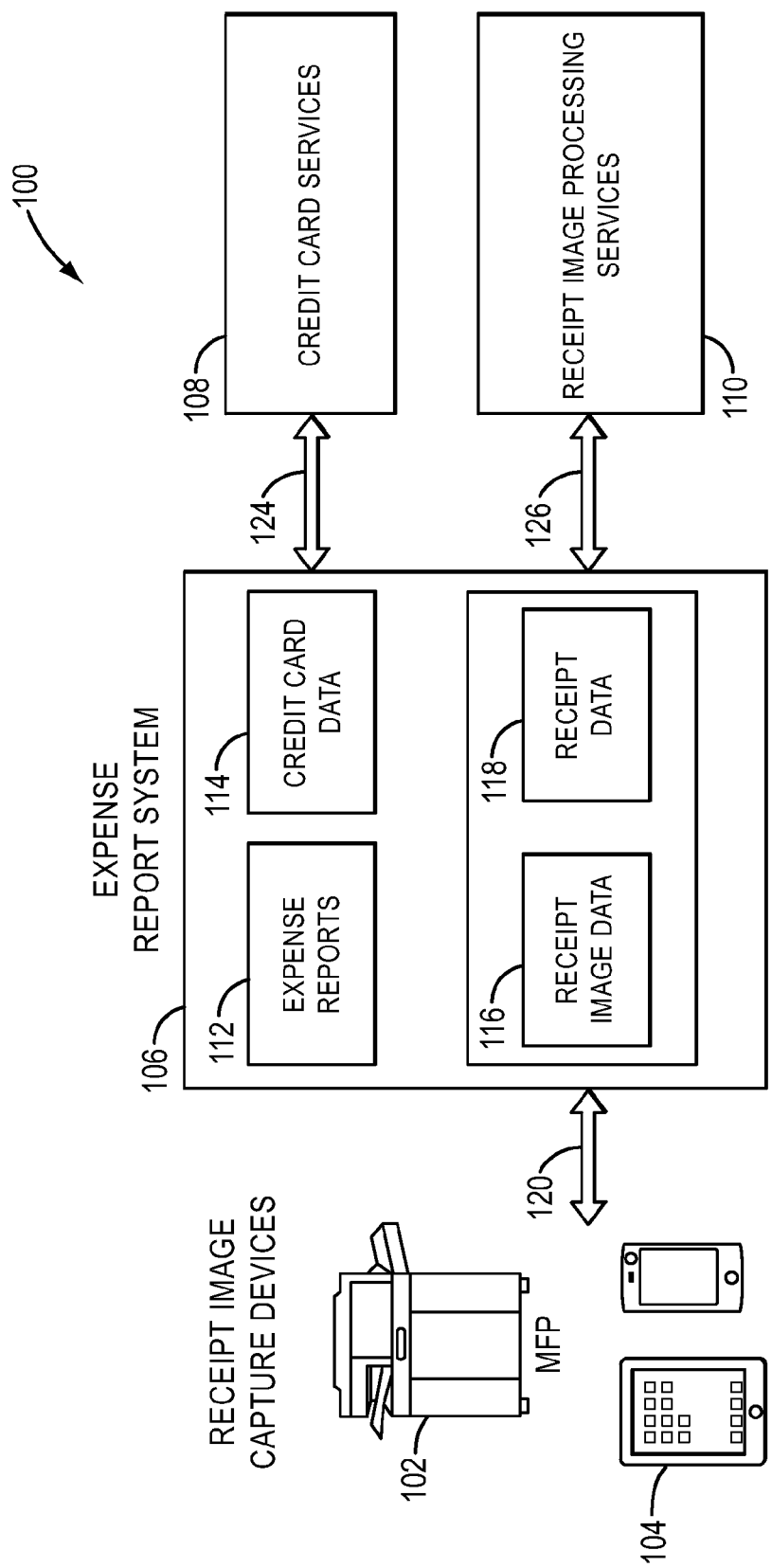
FIG. 1 depicts an overall system configuration according to one embodiment.

FIG. 1 depicts a system configuration 100 according to an embodiment. The system configuration of FIG. 1 includes receipt image capture devices 102, 104 such as MFP 102 and mobile devices 104, an expense report system 106, credit card services 108, and receipt image processing services 110. The expense report system 106 includes expense reports 112, credit card data 114, receipt image data 116, which is the electronic version of the receipt image, and receipt data 118. The expense report system 106 is connected to the receipt image capture devices 102, 104 via communications link 120, to the credit card services 108 via communications link 124, and to the receipt image processing services 110 via communications link 126. In one embodiment, link 120 is an Internet connection, link 124 is an Internet connection, and link 126 is an applications programming interface (API), such as an interface operating in accordance with the Simple Object Access Protocol (SOAP) or Representative State Transfer (REST), or Web APIs. In another embodiment, link 120 is an intranet connection, link 124 is an intranet connection, and link 126 is an applications programming interface (API), such as SOAP/REST or Web APIs.

The expense report system receives the receipt image data 116 via link 120 from the receipt image capture devices 102, 104, credit card data 114 from the credit card services 108 via link 124, and receipt data 118 from the receipt image processing services 110 via link 126. The receipt image processing services 110 receives the receipt image data 116 from the expense report system 106, optically recognizes the characters in the receipt image data 116, and extracts relevant receipt data 118 from the receipt image data 116. Once the expense report system 106 obtains the receipt data 118, the expense report system 106 associates the receipt data 118 and receipt image data 116 with respective credit card data 114 and creates expense data for an expense report 112.

Figure 2:
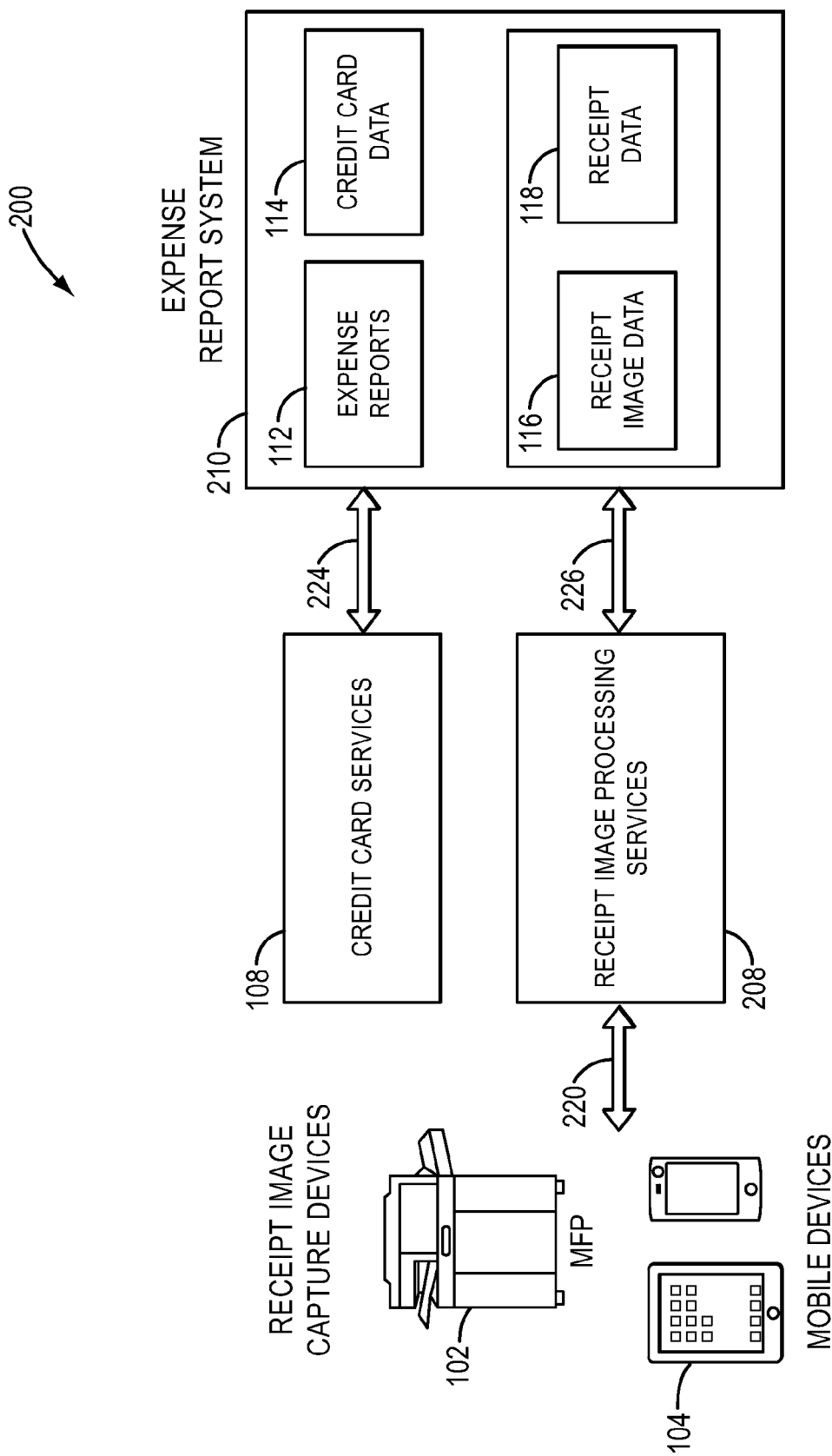
FIG. 2 depicts an overall system configuration according to another embodiment.

FIG. 2 depicts an overall system configuration 200 according to another embodiment. The system configuration 200 of FIG. 2 includes receipt capture image devices 102, 104 such as MFP 102 and mobile devices 104, credit card services 108, receipt image processing services 208, expense report system 210. The expense report system 210 includes expense reports 112, credit card data 114, receipt image data 116, and receipt data 118. The expense report system 210 connects to receipt image processing services 208 via communications link 226 and to the credit card services 108 via communications link 224. The receipt image processing services 208 connects to the receipt image capture devices 102, 104 via communications link 220. In one embodiment, link 220 is an Internet connection, link 224 is an Internet connection, and link 226 is an API, such as SOAP/REST or Web APIs. In another embodiment, link 220 is an intranet/Internet connection, link 224 is an Internet connection, and link 226 is an API, such as SOAP/REST or Web APIs.

The expense report system 210 receives the receipt image data 116 from the receipt image processing services 208 via link 226, credit card data 114 from the credit card services 108 via link 224, and receipt data 118 from the receipt image processing services 208 via link 226. The receipt image processing services 208 receives the receipt image data 116 from the receipt image capture devices 102, 104 via link 220, optically recognizes the characters in the receipt image data 116, and extracts relevant receipt data 118 from the receipt image data 116. Once the expense report system 210 obtains the receipt data 118, the expense report system 210 associates the receipt data 118 and receipt image data 116 with respective credit card data 114 and creates expense data for an expense report 112.

Figure 3:
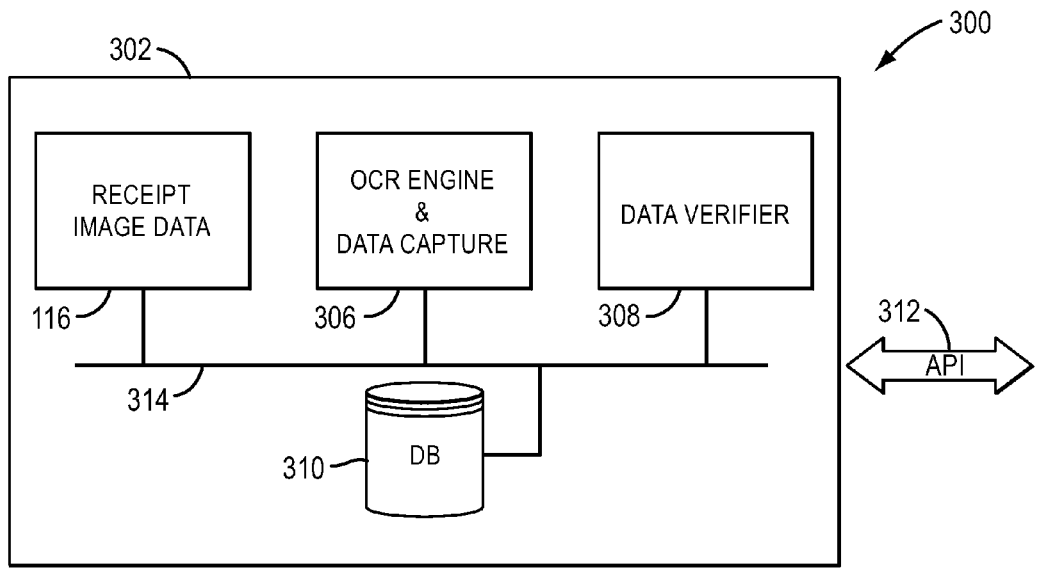
FIG. 3 depicts a high-level diagram of receipt image processing service.

FIG. 3 depicts an example implementation of receipt image processing services 208. The implementation includes receipt image data 116, an OCR Engine 306 with data capture capability, a data verifier 308, and an Application Programming Interface (API) 312. The receipt image data 116, the OCR Engine 306 with data capture, the data verifier, 308 and the database 310 are communicatively coupled, for example, via a bus 314. In one embodiment, bus 314 is a network connection.

The receipt image data 116 is stored in either persistent or non-persistent storage in a system hosting receipt image processing services 300. The OCR engine 306 is aided by a data verifier 308, which includes a user interface, to help increase the accuracy of the extracted receipt data. The database 310 stores the receipt data extracted from the receipt image data 116. The Application Programming Interface 312 provides a programming interface 312 for communicating with external systems such as the expense report system 210 in FIG. 2 or the image capture devices 102, 104, in FIG. 2.

Figure 4:
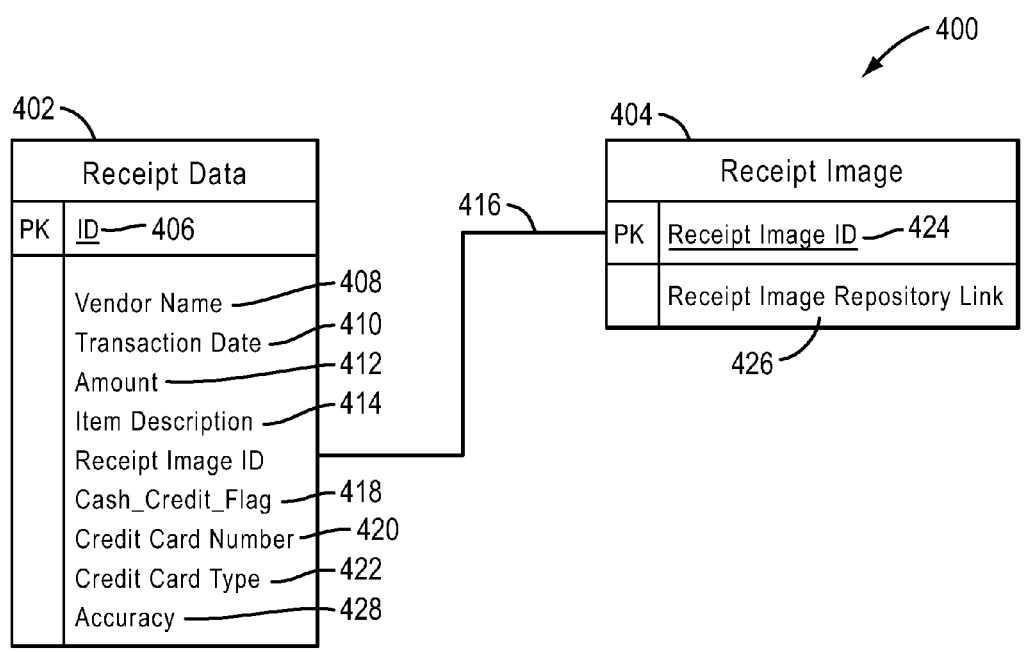
FIG. 4 depicts a high-level data model within the receipt processing system.

FIG. 4 depicts, in one embodiment, a high-level data model 400 within the system that provides receipt processing services 110 in FIG. 1. Other data models are possible and embodiments are not limited to the particular data items depicted and described. The data items used may vary, depending on a particular implementation. The high-level data model 400 includes receipt data 402 and receipt image information 404. Receipt data 402 includes the following data items: vendor name or merchant name 408, transaction date 410, transaction amount 412, an item description 414, receipt image ID 416, a cash or credit/debit transaction flag 418, a credit/debit card number 420, a credit/debit card type 422, an accuracy or uncertainty parameter 428, and an ID 406, which is the primary key (PK) for the data items in the receipt data 402. Receipt image information 404 includes the following data items: a receipt image repository link 426 and a receipt image ID 424, which is the primary key for the receipt image information 404. The receipt image ID data item 416 contains receipt image ID 424 when the receipt image information 404 is associated with the receipt data 402. The receipt image ID 424 identifies the receipt image data (the electronic version of the receipt) that was obtained from the image capture devices 102, 104, in FIG. 1 or FIG. 2. The receipt image repository link 426 is a pointer to a storage area that contains the receipt image data 116. The combination of the receipt image ID 424 and the receipt image repository link 426 provides a unique identifier for the receipt image data in the repository.

Data items 408, 410, 412, 414, 418, 420, 422 are recognized by an OCR engine 306 in FIG. 3. According to one embodiment, one or more uncertainty parameters, such as parameter 428, are associated with one or more of these data items. An uncertainty parameter provides an indication of the expected accuracy of the OCR process with respect to one or more corresponding data items. Uncertainty parameters may be expressed in a wide variety of forms, depending upon a particular implementation. For example, an uncertainty parameter may be expressed as a numerical value between 0 and 1, where 0 represents the lowest level of uncertainty and a 1 represents the highest level of certainty. Uncertainty parameters may be generated and stored by receipt image processing services 300.

According to one embodiment, the uncertainty parameters are displayed on a graphical user interface to provide a visual indication to a user of the expected accuracy of the OCR process with respect to certain data items. For example, when the uncertainty parameter for a data item is below a threshold, the system depicts blank values in the user interfaces depicted in FIG. 10, thereby flagging a user as to the uncertainty of the data. In the data verification user interfaces 800, 900, 1000, 1100, 1200 depicted, a user has an option to correct the data value and area on the receipt image data and associate the area with respective data item of interest. When a user makes such a correction, the changes are fed back to the OCR engine 306 in FIG. 3 to improve accuracy when OCR engine 306 comes across similar receipt image data.

Figure 5:
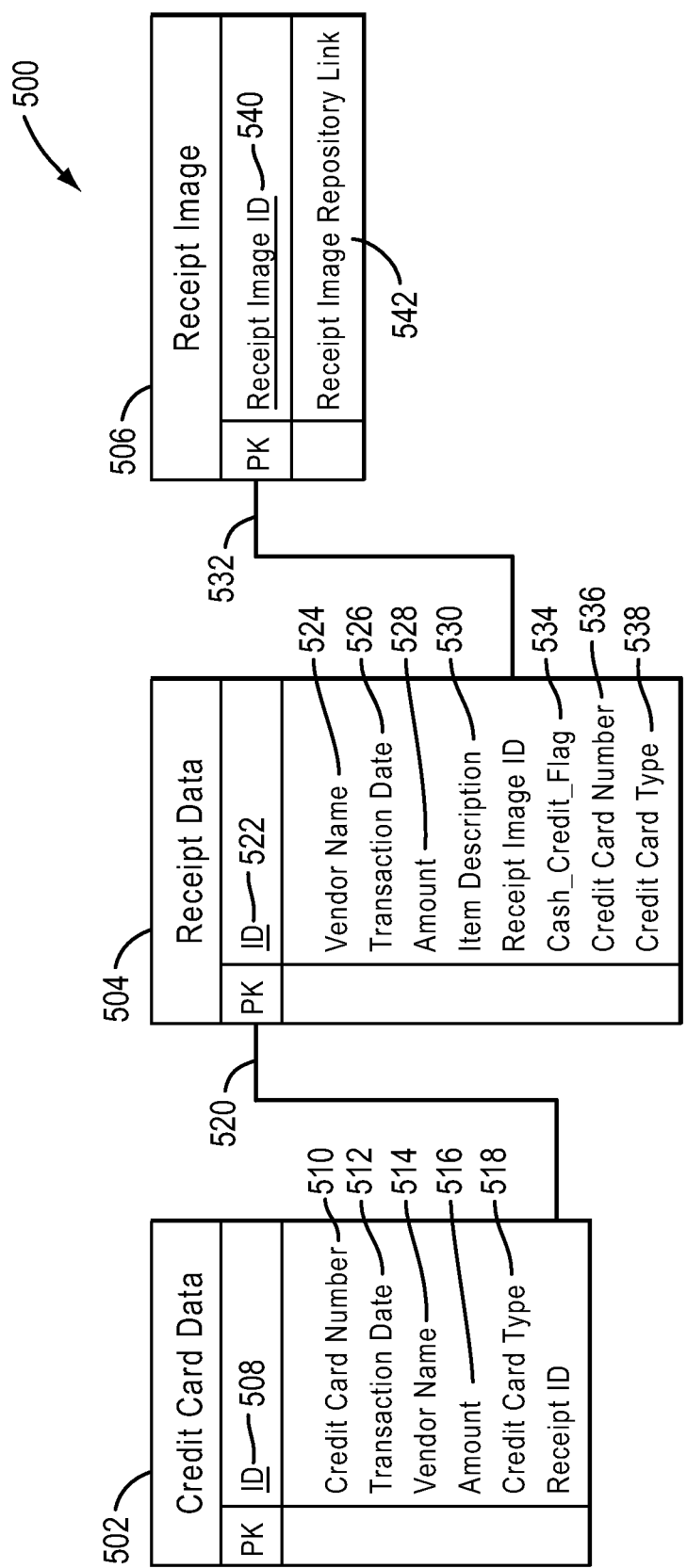
FIG. 5 depicts a high-level data model within the expense report system.

FIG. 5 depicts, in one embodiment of a high-level data model 500 within the expense report system 106, in FIGS. 1 and 210 in FIG. 2. Other data models are possible and embodiments are not limited to the particular data items depicted and described. The data items used may vary, depending on a particular implementation. The high-level data model 500 includes credit card data 502, receipt data 504 and receipt image information 506. Credit card data 502 includes the following data items: a credit/debit card number 510, transaction date 512, a vendor/merchant name 514, a transaction amount 516, a credit/debit card type 518, and a receipt ID 520, and ID 508, which is the primary key for the data items in credit card data 502. Receipt data 504 includes the following data items: vendor/merchant name 524, transaction date 526, transaction amount 528, item description 530, receipt image ID 532, cash-credit flag 534, credit/debit card number 536, credit/debit card type 538, and ID 522, which is the primary key for the data items in receipt data 504. Receipt image information 506 includes the following data items: a receipt image repository link 542, and receipt image ID 540, which is the primary key for the receipt image information 506. Receipt ID 520 contains data item ID 522 when the credit card data 502 is associated with receipt data 504. Receipt image ID 532 contains receipt image ID 540 when the receipt data 504 is associated with receipt image information 506. The receipt image repository link 542 is a pointer to a storage area that contains the receipt image data. The combination of the receipt image ID 540 and the receipt image repository link 542 provides a unique identifier for storing and retrieving the receipt image data in a repository, as database 310 in FIG. 3.

Figure 6:
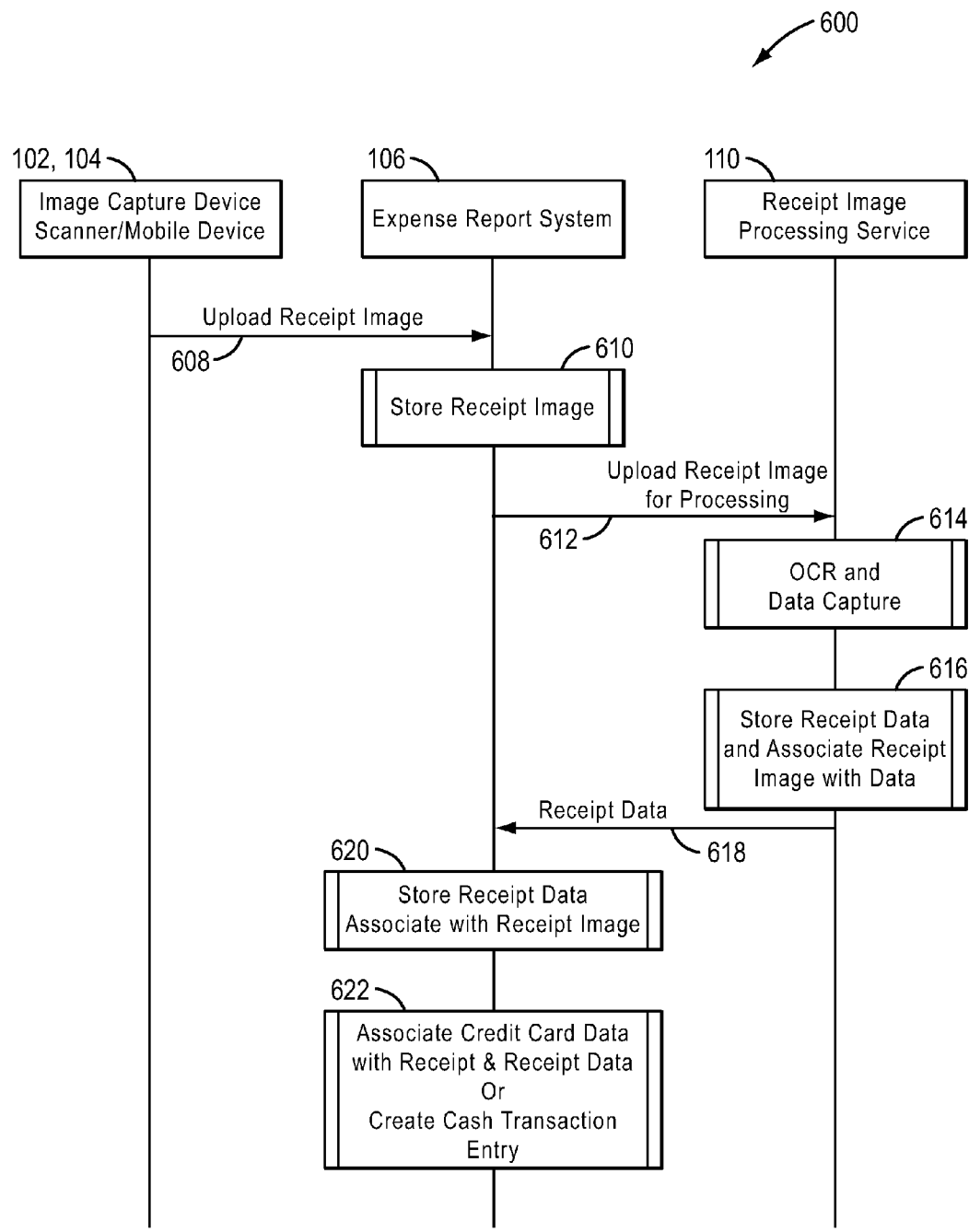
FIG. 6 depicts a data flow diagram with respect to the system of FIG. 1.

FIG. 6 depicts a data flow diagram with respect to the system depicted in FIG. 1. In the figure, data flows among the image capture devices 102, 104, the expense report system 106, and receipt image processing services 110. In step 608, the image capture devices 102, 104 send receipt image data 116 to the expense report system 106. In step 610, the expense report system 106 stores the receipt image data 116. In step 612, the expense report system 106 sends the uploaded receipt image data 116 to receipt image processing services 110. In step 614, receipt image processing services 110 performs optical character recognition and data capture on the receipt image data 116. In step 616, receipt image processing services 110 stores the receipt data 118 and associates the receipt image data 116 with the receipt data 118. In step 618, receipt image processing services 110 sends the receipt data 118 to the expense report system 106, which stores, in step 620, the receipt data 118 and associates the receipt image data 116 with the receipt data 118. In step 622, the expense report system 106 associates credit card data 114 with the receipt data 118 and the receipt image data 116 to create expense data for an expense report 112 or creates expense data for a cash transaction in an expense report 112. In one embodiment, in step 614, receipt image processing services 110 performs OCR with the help of a user who compares the receipt image data 116 with the receipt data 118 to determine whether the OCR engine 306 has correctly captured the receipt data 118 and whether all of the receipt data 118 is present. In one embodiment, a user trains the OCR engine 306 if the receipt data 118 is found to be missing a data item by supplying to the OCR engine 306 an appropriate area on the receipt image data 116 from which to extract a data item and an association that links the area with a data item in the receipt data 118.

Figure 7:
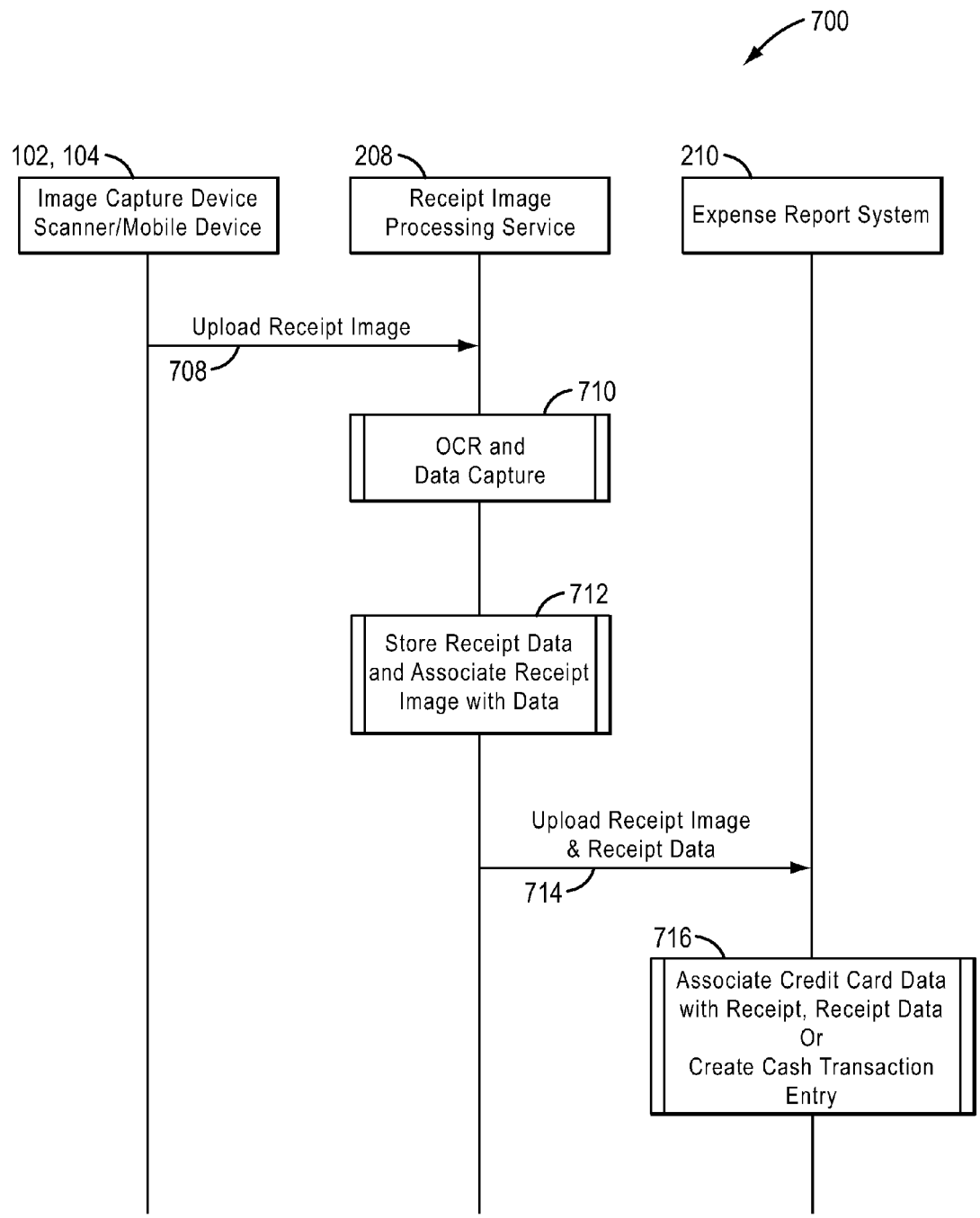
FIG. 7 depicts a data flow diagram with respect to the system of FIG. 2.

FIG. 7 depicts a data flow diagram with respect to the system depicted in FIG. 2. The data flows among the image capture devices 102, 104, receipt image processing services 208, and the expense report system 210. In step 708, the image capture devices 102, 104 send receipt image data 116 to receipt image processing services 208. In step 710, receipt image processing services 208 performs the OCR and data capture of the receipt image data 116. In step 712, receipt image processing services 208 stores the receipt data 118 and associates the receipt image data 116 with the receipt data 118. In step 714, receipt image processing services 208 sends the receipt image data 116 and receipt data 118 to the expense report system 210. In step 716, the expense report system 210 associates the credit card data 114 with the receipt data 118 and the receipt image data 116 to create expense data for an expense report 112 or creates expense data for a cash transaction in an expense report 112. Other details of receipt image processing services 208 are the same as those in FIG. 6.

Figure 8:
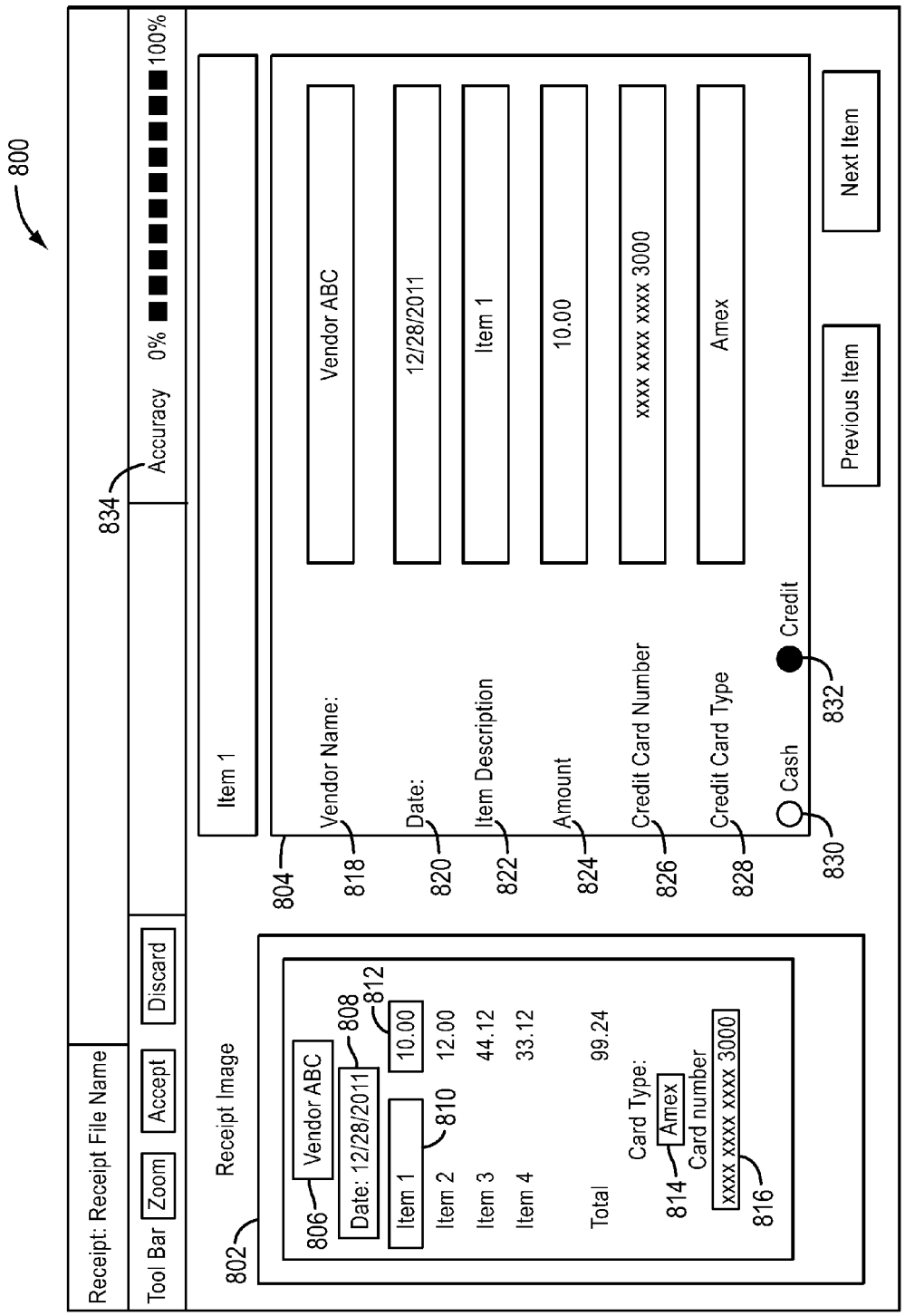
FIG. 8 depicts an example user interface of the data verification system.
Figure 9:
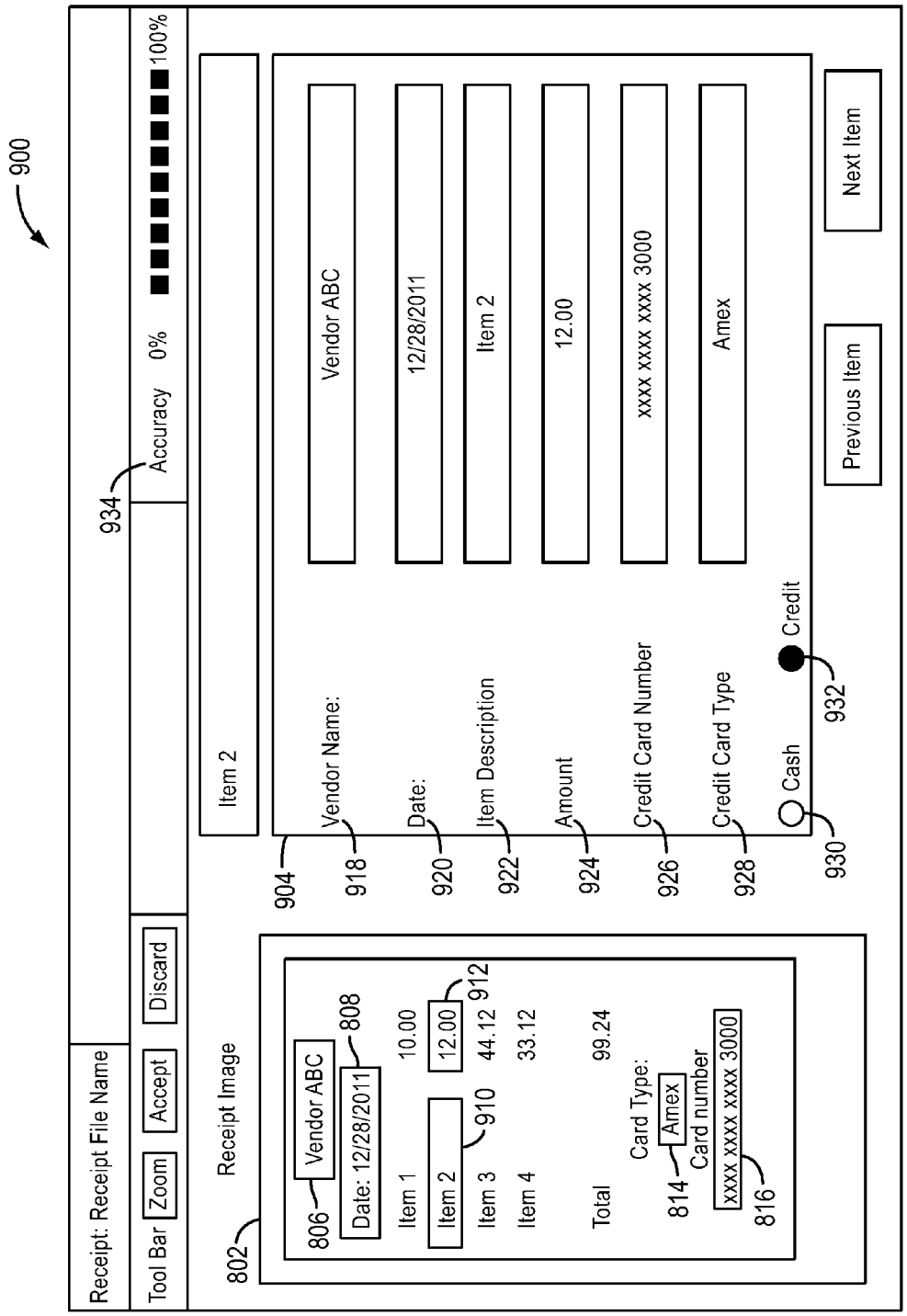
FIG. 9 depicts an example user interface of the data verification system.
Figure 10:
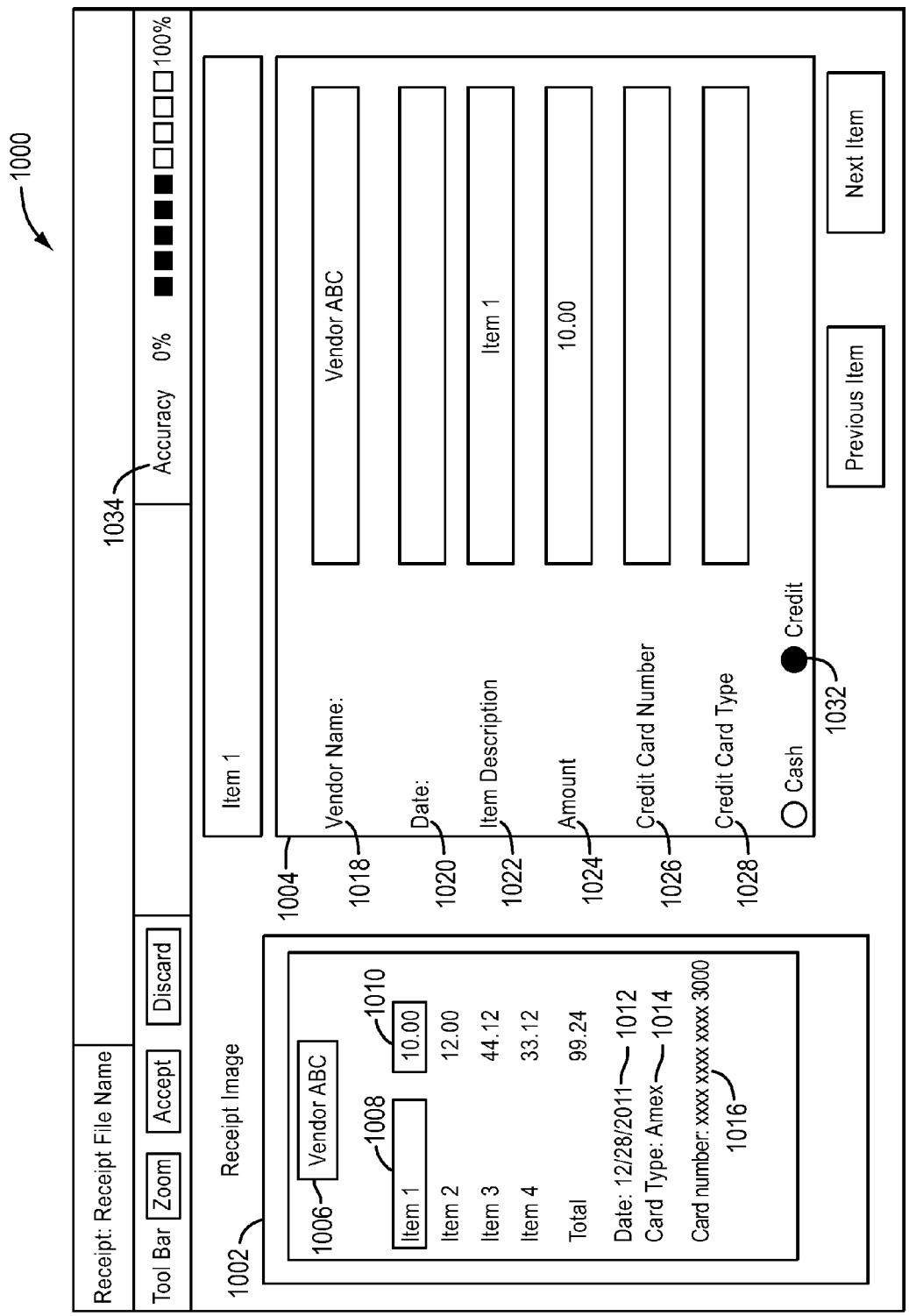
FIG. 10 depicts an example in which the OCR engine is unable to identify the data items correctly.
Figure 11:
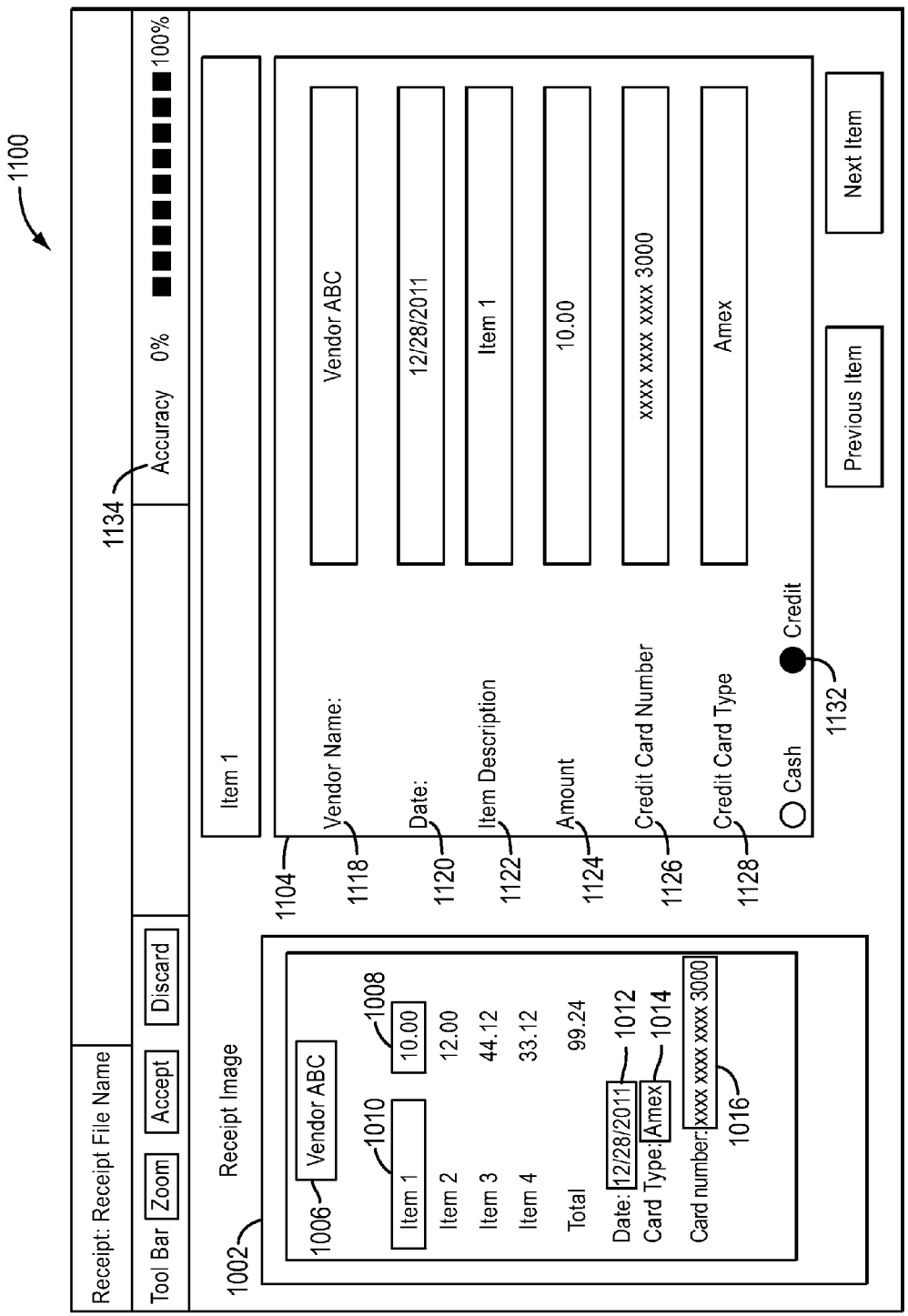
FIG. 11 depicts a user association of an image with data items to aid the OCR engine.
Figure 12:
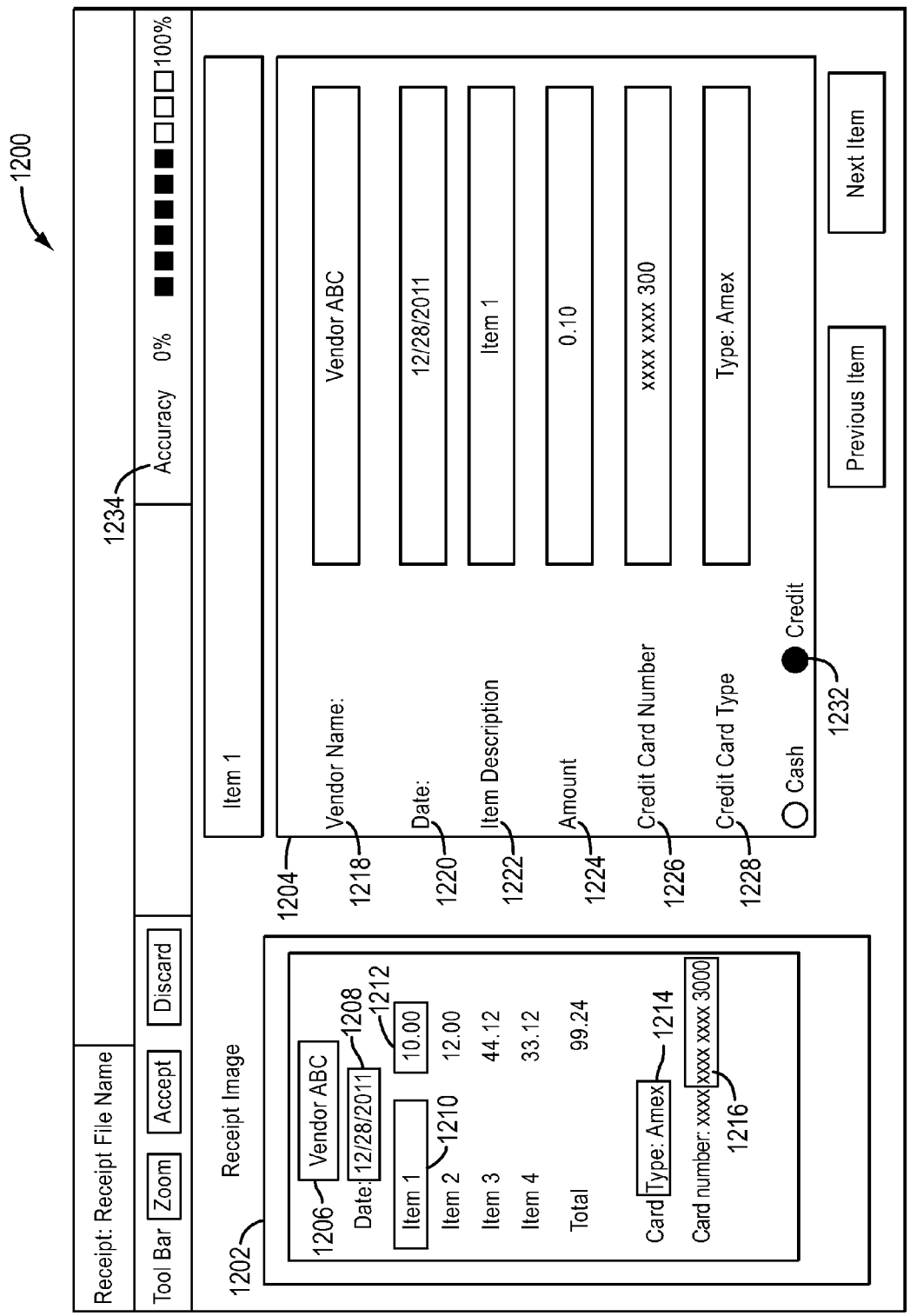
FIG. 12 depicts an example in which the OCR engine is unable to identify the data items accurately.
Figure 13:
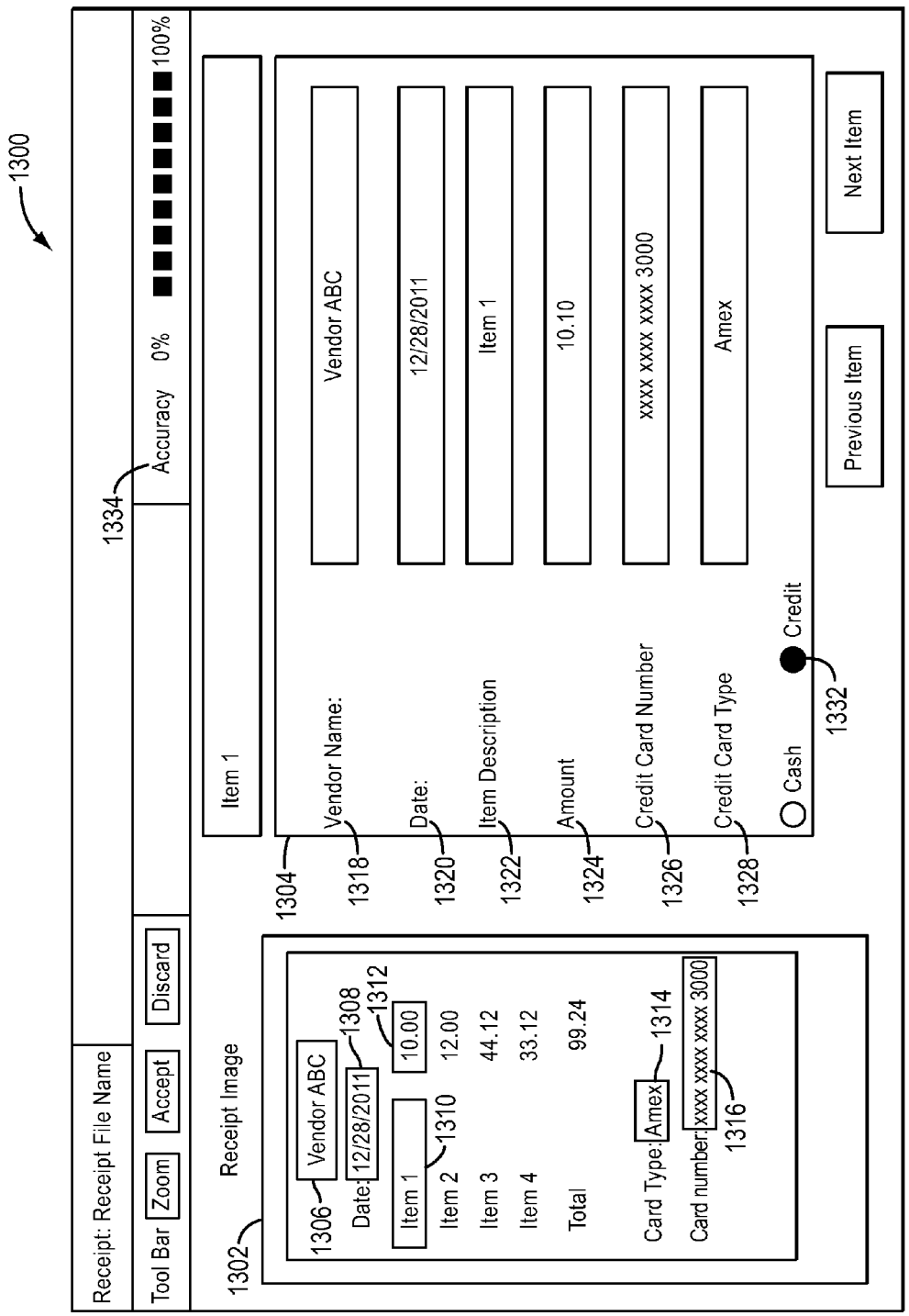
FIG. 13 depicts a user's correction for the errors depicted in FIG. 12.

FIGS. 8, 9, 10, 11, and 12 depict example user interfaces operable in conjunction with the data verifier 308 in FIG. 3. FIGS. 8 and 9 depict a receipt image and receipt data for items 1 and 2 on the receipt image, respectively. FIGS. 10 and 11 depict the example in which the OCR engine 306 in FIG. 3 fails to capture one or more data items and a user supplies the missing item or items. FIGS. 12 and 13 depict the example in which the OCR engine 306 captures one or more data items incorrectly and a user corrects the incorrect items.

The example user interface depicted in FIG. 8 includes data areas in the receipt image 802, and data items in the receipt data for a particular item, item 1, in the receipt image 802 when the data is correctly captured by the OCR engine 306. The data areas in the receipt image 802 include a vendor/ merchant name 806, the transaction date 808, the item 1 description 810, the transaction amount 812, a credit/debit card type 814, and the credit/debit card number 816. The receipt data 804 for item 1 includes the vendor/merchant name 818, the transaction date 820, the item 1 description 822, the transaction amount 824, the credit/debit card number 826, and the credit/debit card type 828. Additionally, the receipt data 804 depicted includes a "cash" radio button 830 and a "credit" radio button 832, which for the example depicted is marked, because the item 1 transaction is a credit transaction. The figure depicts that the OCR engine 306 identified the receipt data 804 for item 1 correctly and accurately because each data area in the receipt image 802 pertaining to item 1 has a corresponding data item in the receipt data 804 for item 1 that is correctly captured. Additionally, an accuracy scale 834 indicates to the user that the receipt data 804 is correct and accurate.

FIG. 9 depicts another example user interface. The user interface in FIG. 9 includes data areas in the receipt image 802, and data items in the receipt data 904 for item 2 in the receipt image 802 when the data is correctly captured by the OCR engine 306. The data areas in the receipt image 802 include a vendor/merchant name 806, the transaction date 808, the item 2 description 910, the transaction amount 912, a credit/debit card type 814, and the credit/debit card number 816. The data items in the receipt data 904 for item 2 include a vendor/merchant name 918, the transaction date 920, the item 2 description 922, the transaction amount 924, the credit/debit card number 926, and the credit/debit card type 928. Additionally, the receipt data 904 depicted has a "cash" radio button 930 and a "credit" radio button 932, which is marked, because the item 2 transaction is a credit transaction. The figure depicts that the OCR engine 306 identified the receipt data 904 for item 2 correctly and accurately because each data area in the receipt image 802 pertaining to item 2 has a corresponding data item in the receipt data 904 for item 2 that is correctly captured. Additionally, accuracy scale 934 indicates that the receipt data 904 is correct and accurate.

The user interfaces depicted in FIG. 10 and FIG. 11 depict how a user can improve the ability of the OCR engine 306 to capture data from receipt image data.

FIG. 10 depicts an example in which the OCR engine 306 is unable to identify the data items for item 1 correctly. In the depicted example, the receipt image 1002 data areas include a vendor/merchant name 1006, the item 1 description 1008, the transaction amount 1010, the transaction date 1012, a credit/debit card type 1014, and the credit/debit card number 1016. The receipt image 1002 depicted in FIG. 10 is different from the receipt image 802, 902 respectively depicted in FIGS. 8 and 9 in that the transaction date area 1012 has a new location on the receipt image 1002. The transaction date area 1012 is now located near the credit/debit card type 1014 data area, instead of near the vender/merchant name data area 1006. The receipt data 1004 data items for item 1 include the vendor/merchant name 1018, the transaction date 1020, the item 1 description 1022, the transaction amount 1024, the credit/debit card number 1026, and the credit/debit card type 1028. The credit radio button 1032 is set. However, in the figure, the OCR engine 306 has left the transaction date 1020, the credit/debit card number 1026, and the credit/debit card type 1028 data items blank, because uncertainty parameters for the blank data items are below a given threshold. In this embodiment, the OCR engine 306 has thus illustrated the uncertainty parameters by leaving the transaction date 1020, the credit/debit card number 1026, and the credit/debit card type 1028 data items blank. Additionally, an accuracy scale 1034 indicates that the receipt data 1004 accuracy is below 100%.

FIG. 11 depicts the example in which a user provides missing data items to the data verifier. In FIG. 11, receipt image 1002 data areas include vendor/merchant name 1006, the item 1 description 1008, the transaction amount 1010, the transaction date 1012, the credit/debit card type 1014, and the credit/debit card number 1016. The data items for item 1 in the receipt data 1104 include the vendor/merchant name 1118, the transaction date 1120, the item 1 description 1122, the transaction amount 1124, the credit/debit card number 1126, and the credit/debit card type 1128. The credit radio button 1132 is set. In the figure, a user has filled in the transaction date 1120, the credit/debit card number 1126, and the credit/debit card type 1128, thereby raising the accuracy indicator 1134 to 100%. The user has also outlined or otherwise marked the data areas for the transaction date 1012, for the credit/debit card type 1014, and for the credit/debit card number 1016, so that the OCR engine 306 can better process this type of receipt image 1002 the next time it processes such a type. In one embodiment, a user outlines the un-captured data areas with colored boundaries that correlate with colored boundaries around the corresponding data items in the receipt data. For example, a user outlines: the data area for the transaction date 1012 on the receipt image 1002 with a blue rectangle, which corresponds with a blue rectangle surrounding the transaction date 1120 in the receipt data 1104; the data area for the credit/debit card type 1014 on the receipt image 1002 with a green rectangle, which corresponds with a green rectangle surrounding the credit/debit card type 1128 in the receipt data 1104; and the data area for the credit/debit card number 1016 on the receipt image 1002 with a brown rectangle, which corresponds with a brown rectangle surrounding the credit/debit card number 1126 in the receipt data 1104. Other markings that correlate the data areas in the receipt image 1002 with the data items in the receipt data 1104 can be used.

Sometimes the OCR engine captures a data area on the receipt image, but does so inaccurately. The data item in the receipt data is not blank but the data in the data item is not accurate according to the receipt image. FIGS. 12 and 13 depict this example.

In FIG. 12, some of the data items in the receipt data 1204 do not match the corresponding data areas in the receipt image 1202. In the figure, data areas of the receipt image 1202 include vendor/merchant name 1206, the transaction date 1208, the item description 1210, the transaction amount 1212, the credit/debit card type 1214, and the credit/debit card number 1216. The data items of the receipt data 1204 include the vendor/merchant name 1218, the transaction date 1220, the item description 1222, the transaction amount 1224, the credit/debit card number 1226, and the credit/debit card type 1228. The credit radio button 1232 is marked. However, while the other captured data items in the receipt data 1204 for item 1 match the data areas in the receipt image for item 1, the transaction amount 1212 on the receipt image 1202 does not match the captured transaction amount 1224 in the receipt data 1204 and the credit/debit card number 1216 on the receipt image 1202 does not match the captured credit/debit card number 1226 in the receipt data 1204. Additionally, an accuracy scale 1234 indicates that the receipt data 1204 accuracy is less than 100%.

In FIG. 13, a user corrects the inaccurate data items in the receipt depicted in FIG. 12. In the figure, the data areas in receipt image 1302 include the vendor/merchant name 1306, the transaction date 1308, the item description 1310, the transaction amount 1312, the credit/debit card type 1314, and the credit/debit card number 1316. The data items in the receipt data 1304 include the vendor/merchant name 1318, the transaction data 1320, the item description 1322, the transaction amount 1324, the credit/debit card number 1326, and the credit/debit card type 1328. The credit radio button 1332 is marked. In the figure, a user has corrected the transaction amount 1324 and the credit/debit card number 1326 to match the data for those items in the receipt image 1302, thereby raising the accuracy indicator 1334 to 100%. The corrected transaction amount 1324 and credit/debit card number 1326 are supplied to the OCR engine 306 to improve its accuracy. Additionally, data areas 1312, 1316 for those items are delineated to further aid the OCR engine 306.

Figure 14:
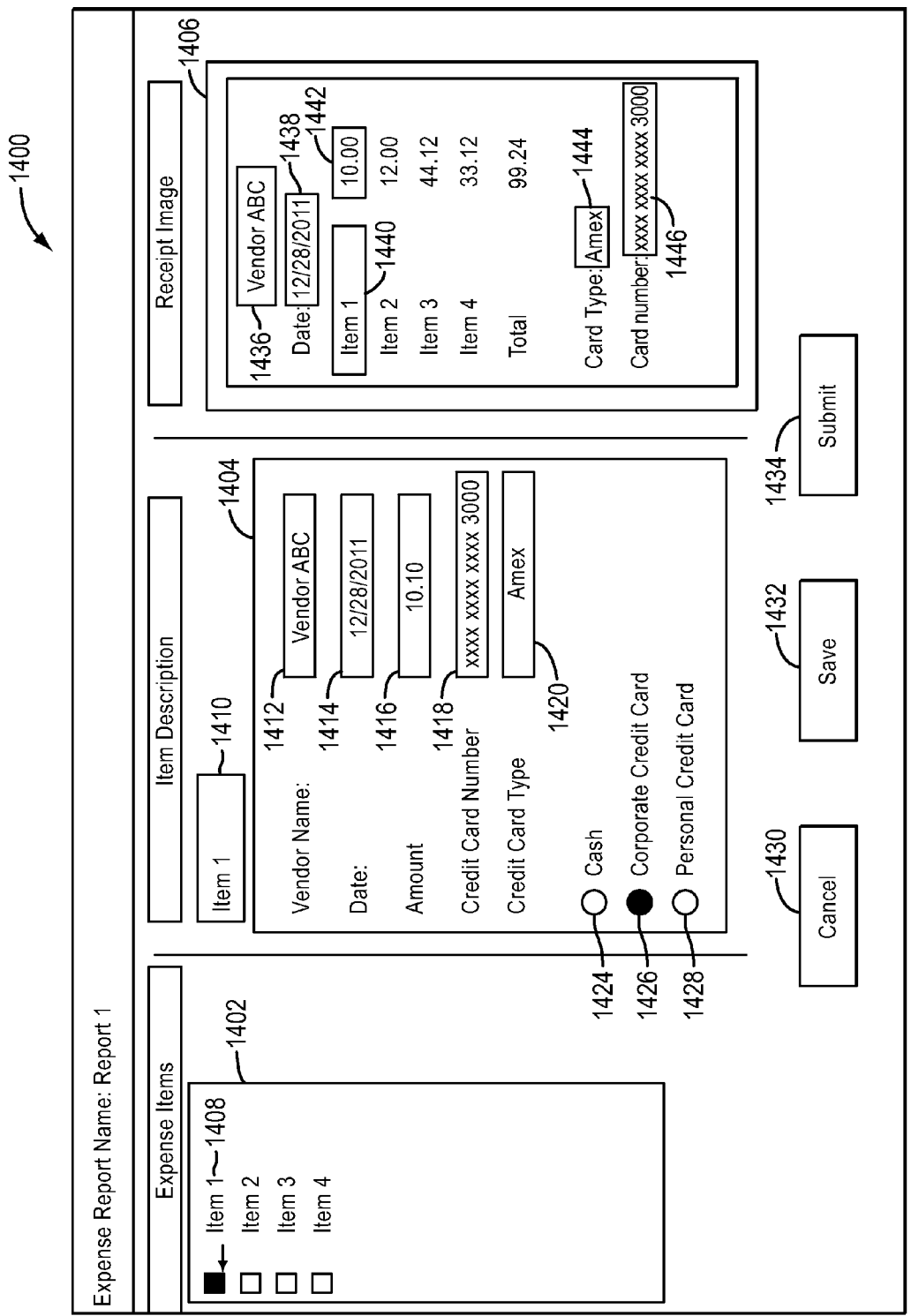
FIG. 14 is a depiction, in one embodiment, of expense data.

FIG. 14 depicts, in one embodiment, expense data 1400 for an expense report. The expense data includes expense item list 1402, a receipt data 1404 for an item, and a receipt image 1406. The expense item list 1402 includes one or more selectable expense items, item 1 1408 of which is selected. The data items in the receipt data 1404 for item 1 1408 include a vendor/merchant name 1412, the transaction date 1414, the transaction amount 1416, a credit/debit card number 1418, and the credit/debit card type 1420. The receipt image 1406 includes data areas that contain the vendor/merchant name 1436, the transaction date 1438, the item description 1440, the transaction amount 1442, the credit/debit card type 1444, and the credit/debit card number 1446. A marked button 1426 in the receipt data 1404 indicates that item 1 1410 is a corporate credit card transaction, rather than a cash transaction 1424 or a personal credit card transaction 1428. The expense data 1400 further includes a cancel button 1430, a save button 1432, and a submit button 1434. The cancel button 1430, when activated, prevents the expense data from being included in an expense report; the save button 1432, when activated, saves the expense data for later action, either a cancellation or a submission. The submit button 1434, when activated, assures that the expense data 1400 is part of an expense report.

Figure 15:
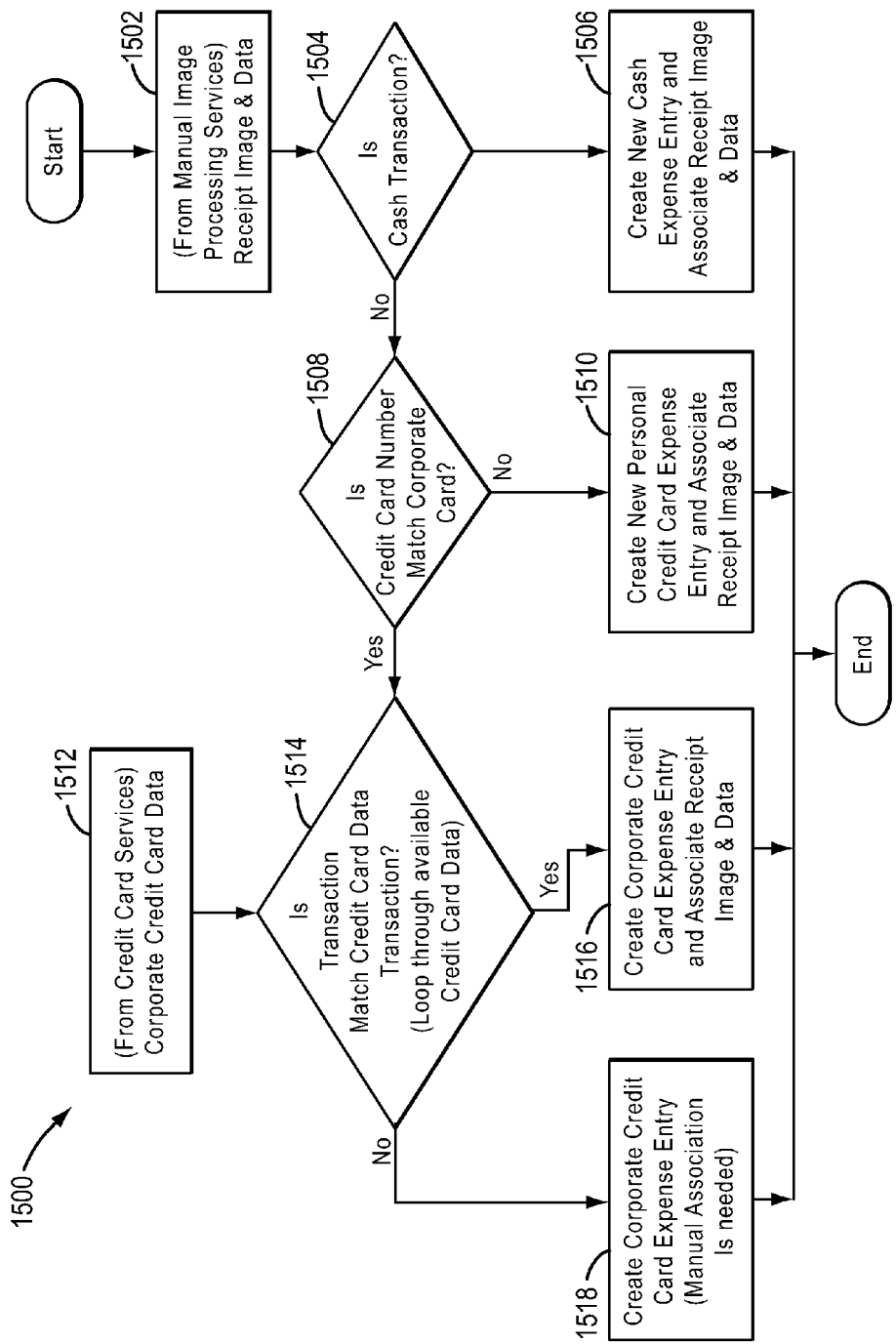
FIG. 15 depicts a flow, in one embodiment, of data extracted from receipts.

[FIG. 15 depicts a flow, in one embodiment, of how the receipt data is associated with credit card transaction data and expense data is created in the expense management system. In step 1502, receipt image processing services 110, 208 provides the receipt image data 116 and the receipt data 118. In step 1504, the system checks the receipt image data 116 and receipt data 118 to determine whether the transaction is a cash transaction. If so, the system creates cash expense data and associates the cash expense data with the receipt image data 116 and receipt data 118 in step 1506. If the transaction is a credit transaction, as determined in step 1504, the system determines, in step 1508, whether the credit/debit card number on the receipt data 118 matches a corporate card number. If there is no match, as determined in step 1508, then the system creates new expense data for personal credit card transaction and associates the new expense data with receipt image data 116 and receipt data 118 in step 1510. If the credit/debit card number in the transaction is a corporate credit/debit card number, as determined in step 1508, then, in step 1514, the system compares the credit/debit card number with the credit card data 1512 available from corporate credit card services 108. If there is a match, as determined in step 1514, the system creates expense data for a corporate credit card transaction and associates the expense data with the receipt image data 116 and receipt data 118 in step 1516. If there is no match found between the corporate credit card data and the receipt data 118, as determined in step 1514, the system creates expense data with receipt image data 116 and receipt data 118, and a user manually associates, in step 1518, this expense data with credit card data and the receipt image data 116 and receipt data 118.

Figure 16:
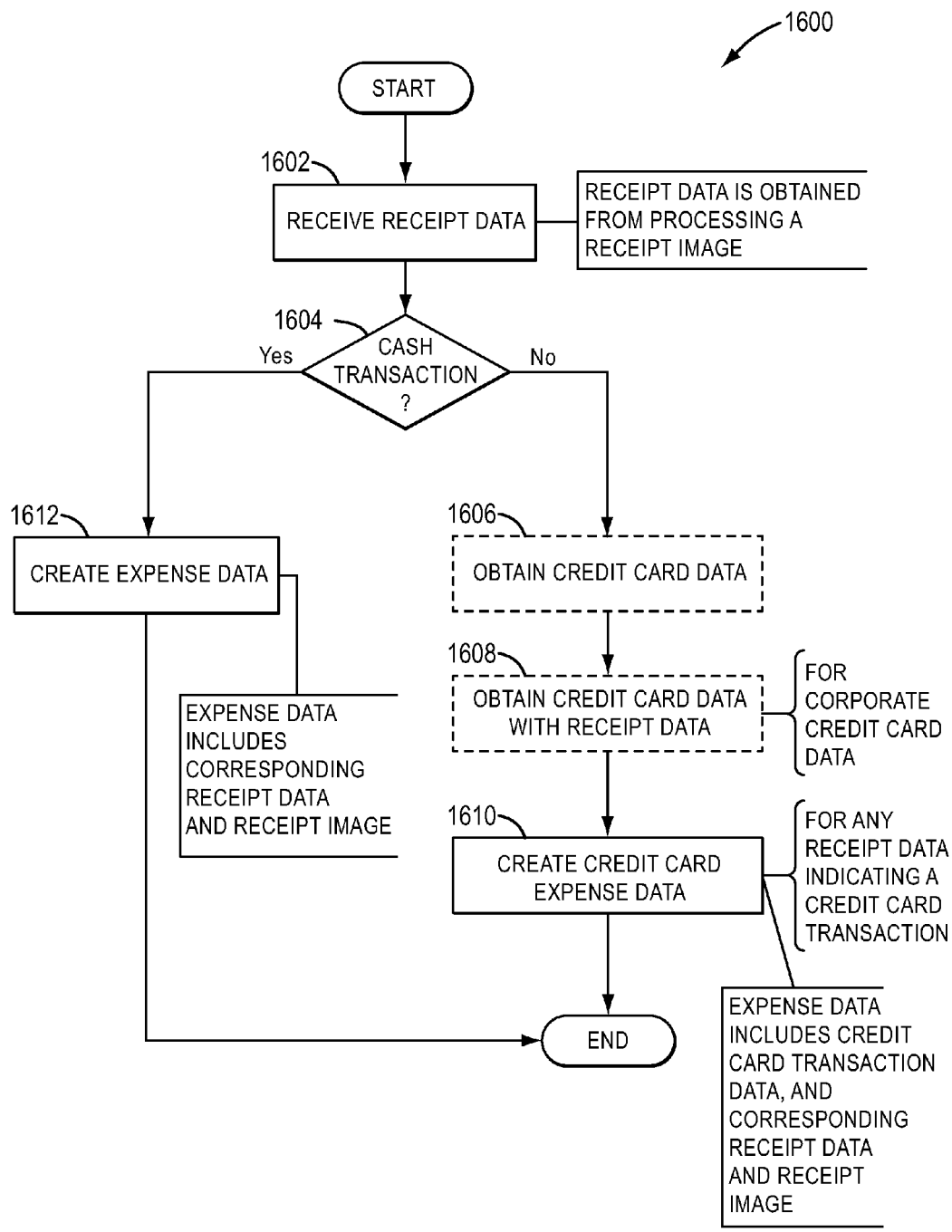
FIG. 16 depicts a flow in accordance with an embodiment.

FIG. 16 depicts a flow chart for an embodiment. In step 1602, the system receives receipt data 118 from receipt processing services 110. If the receipt data 118 indicates a credit transaction, as determined in step 1604, then, in optional step 1606, the system obtains credit card data. In optional step 1608, the system matches the credit card data with the receipt data 118, when the credit card data is corporate credit card data. In step 1610, the system creates credit card expense data for any receipt data 118 indicating a credit card transaction, where the expense data includes credit card transaction data, and corresponding receipt data 118 and receipt image data 116. If the receipt data 118 indicates a cash transaction, then, in step 1612, the system creates expense data, where the expense data includes the corresponding receipt data 118 and receipt image data 116.

Templates

As used herein, template refers to a data structure that contains information about the location, size, shape, and orientation of various data areas in an image, such as a particular receipt image. In one embodiment, the data structure is an object that contains offsets, sizes, shapes, and orientations for each data area in a particular receipt such that, when the data structure is represented visually over the receipt image, each data area exposes to view only the corresponding data item in the receipt image.

Creating a template to aid the OCR engine capture with better accuracy decreases the time needed to verify and extract data from receipt. In one embodiment, a user previews a captured receipt image and views a matching template returned by image processing service. The user can accept the template identified by the OCR engine, modify the template, or create a new template. To modify the template, the user indicates the data area or areas for adjustment on an existing data extraction template, and then repositions those data areas on the receipt image to update the template. To create a new template, user indicates data areas for capture and their locations on the receipt image and then builds a data extraction template based on those data areas.

Figure 17:
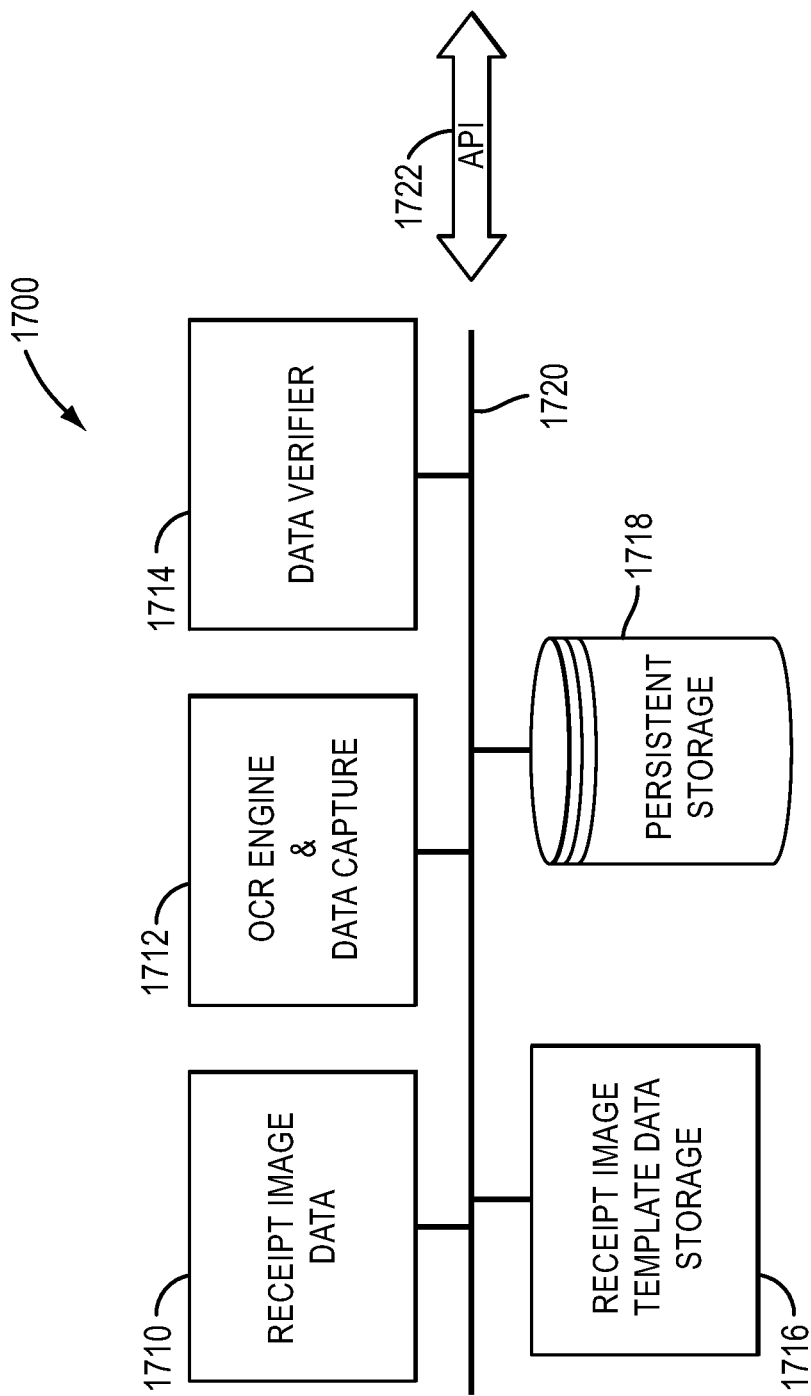
FIG. 17 depicts an embodiment of the receipt image processing services 1700.

FIG. 17 depicts an example implementation of receipt image processing services 1700 that supports the use of templates. The implementation includes receipt image data 1710, an OCR engine 1712 with data capture capability, a data verifier 1714, a receipt image template data storage 1716 (hereinafter, template data or template repository), a persistent storage device 1718, which are communicatively coupled, for example, via a bus 1720. In one embodiment, bus 1720 is a network connection. An Application Programming Interface (API) 1722 provides access to services 1700. The receipt image data 1710 is configured to store receipt image data obtained from transaction receipts. The OCR engine & data capture 1712 (hereinafter "the OCR engine") is designed to capture data by optically recognizing characters in image data. The data verifier 1714 is configured to allow a user to interact with the OCR engine 1712. The receipt image template data storage 1716 is configured to store templates relating to receipt images, where a template provides a particular layout or arrangement of data areas corresponding to data items in receipt image data. The persistent storage device 1718 is configured to store receipt data obtained by the OCR engine 1712 or the OCR engine 1712 in combination with the data verifier 1714. The API interface 1722 operates to provide various functions in receipt image processing services 1700 to agents that interact with receipt image processing services 1700. In one embodiment of the API, an external agent provides receipt image data to services 1700 and requests that receipt data contained in the receipt image data be returned. In response to the API request, receipt image processing services 1700 obtains a template for extracting data items from the receipt image data and provides the receipt data to the requestor.

Figure 18:
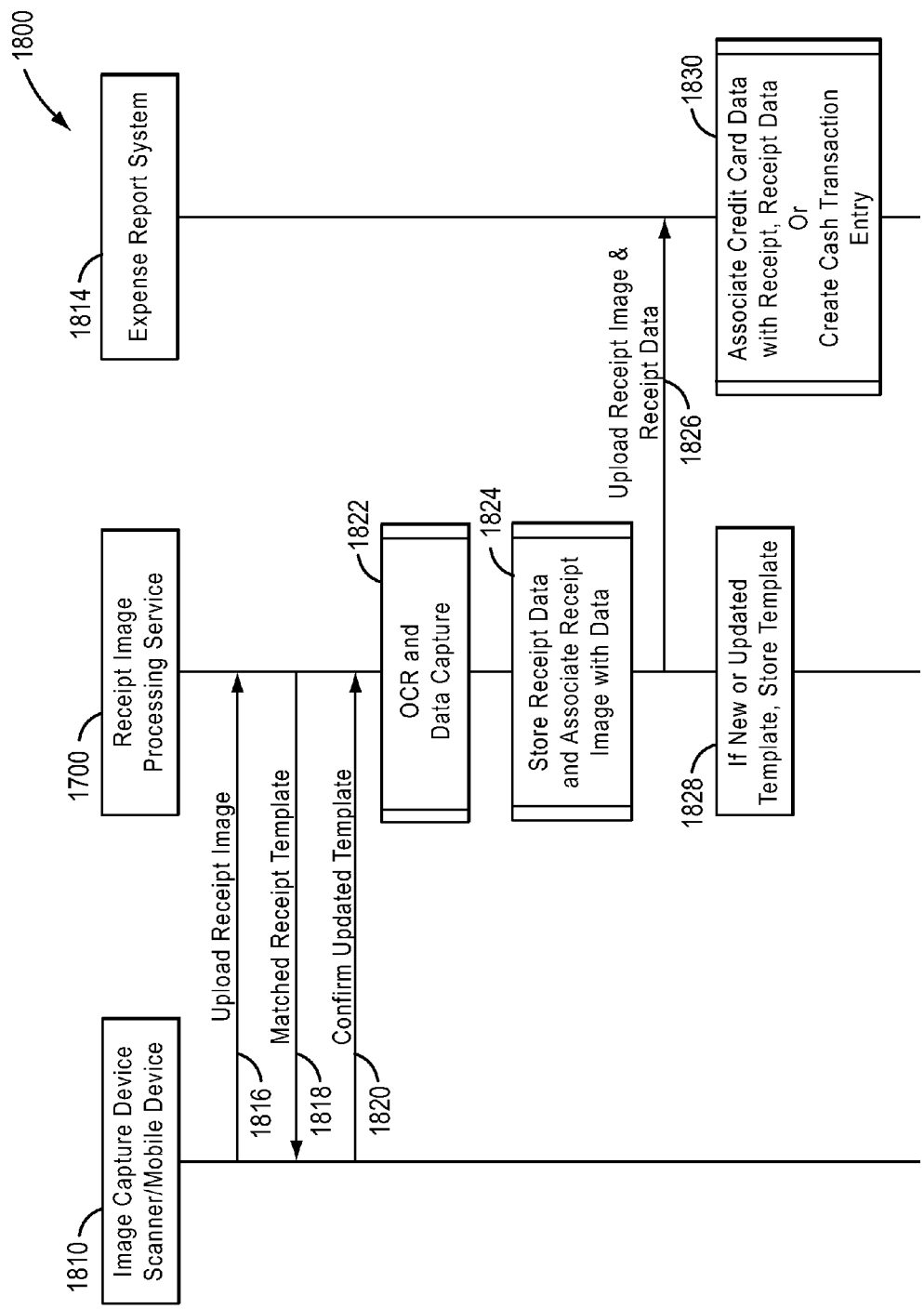
FIG. 18 depicts an embodiment of the data flow for the system depicted in FIG. 2 and in FIG. 16.

FIG. 18 depicts an embodiment of the data flow for the system depicted in FIG. 2 and in FIG. 17. Data flow occurs among the image capture device 1810, receipt image processing services 1700, and the expense report system 1814.

In step 1816, the image capture device 1810 uploads the receipt image data, which has a particular layout of data items, to receipt image processing services 1700. Upon receiving the receipt image from the image capture device 1810, receipt image processing services 1700 selects, from the templates in the receipt image template data storage 1716, a template having a layout that corresponds to the particular layout of data items in the receipt image data. In one embodiment, metadata associated with a stored template aids in the selecting process. Metadata includes locations of the data areas including the relative positions of the data areas with respect to each other as well as the absolute positions of the data areas with respect to the template's outer boundaries. Metadata further includes keywords, which are labels for the data areas, which are likely to match words found in the receipt image data. Matching locations of data areas and keywords found in the receipt thus helps receipt image processing services 1700 to locate a template in the in the receipt image template data storage 1716 that is suited for data capture of the data items in the receipt image.

In step 1818, the receipt image processing service then transfers the selected template for review by a user to an image capture device 1810, such as a digital scanner, digital camera, smart phone, or tablet computer, which has a touch panel display screen. In step 1820, a user at the image capture device 1810 reviews the selected template and determines whether the selected template is suitable for extracting data from the receipt image. If the user decides that the selected template is suitable, then the image capture device 1810 transfers the template to the receipt image processing service 1700 for use as the data extraction template for the receipt image data.

Alternatively, if the user decides that the selected template is not suitable, the user can either modify an existing template or create a new template. If the user modifies an existing template, the modified template, described in more detail below, is sent in step 1820 to receipt image processing services 1700 for use as the data extraction template. If the user creates a new template, then the new template, described in more detail below, is sent in step 1820 to receipt image processing services 1700 as the data extraction template. Thus, the data extraction template is either the selected template, a user-modified template, or a new template.

In step 1822, the OCR engine 1712 in receipt image processing services 1700 then captures the receipt data from the receipt image data in accordance with the data extraction template obtained in step 1820. In step 1824, the captured receipt data is stored in receipt image processing services 1700 and the receipt image data is associated with the captured receipt data. In step 1826, receipt image processing services 1700 transmits the receipt image data and receipt data to the expense report system 1814. In step 1828, if the data extraction template is either a new or updated template, then the data extraction template is stored in receipt image template data storage 1716. In step 1830, if the transaction is a credit/debit transaction, the expense report system associates credit/debit card data pertaining to the transaction with the receipt data and creates expense data for an expense report. The expense data includes the receipt image data and the receipt data, which includes the associated credit/debit card information. If the transaction is a cash transaction, the expense report system creates expense data for a cash transaction.

Figure 19:
FIG. 19 depicts an embodiment of the user interface for the image capture device.
Figure 20:
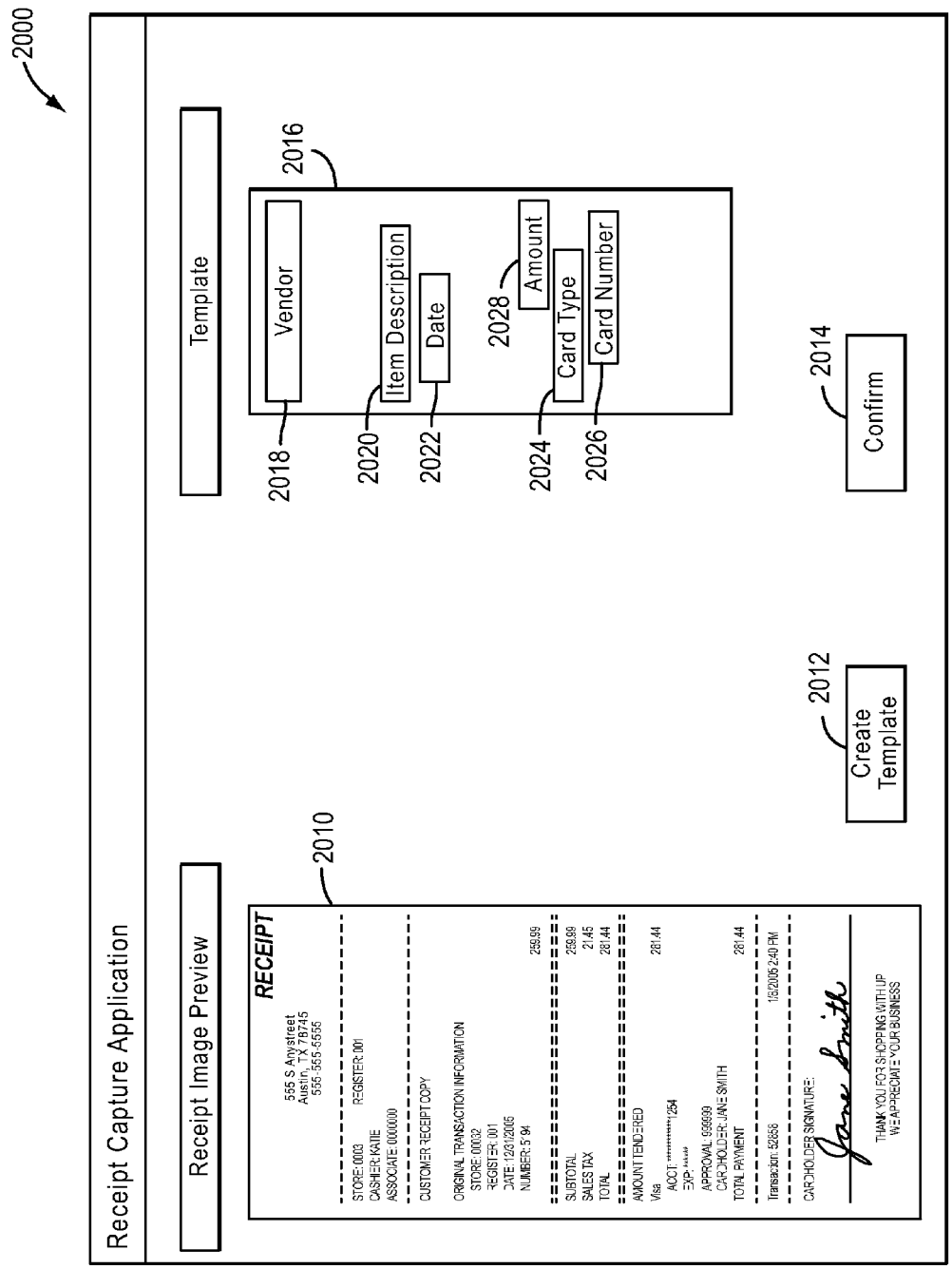
FIG. 20 depicts a user interface screen that displays the receipt image and the data areas according to a selected template.
Figure 23:
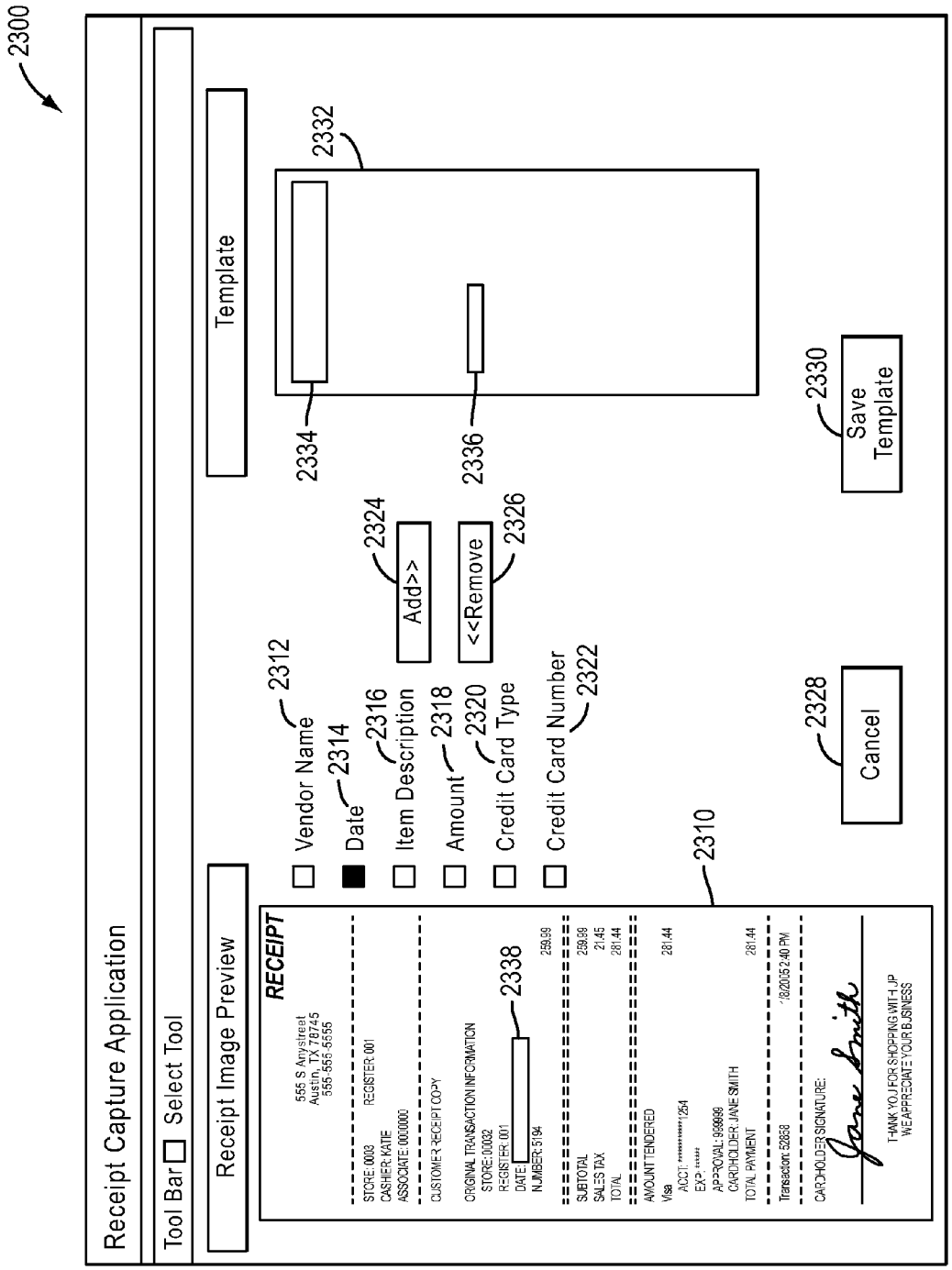
FIG. 23 depicts an embodiment of the user interface for adding another specific data area to the template.
Figure 24:
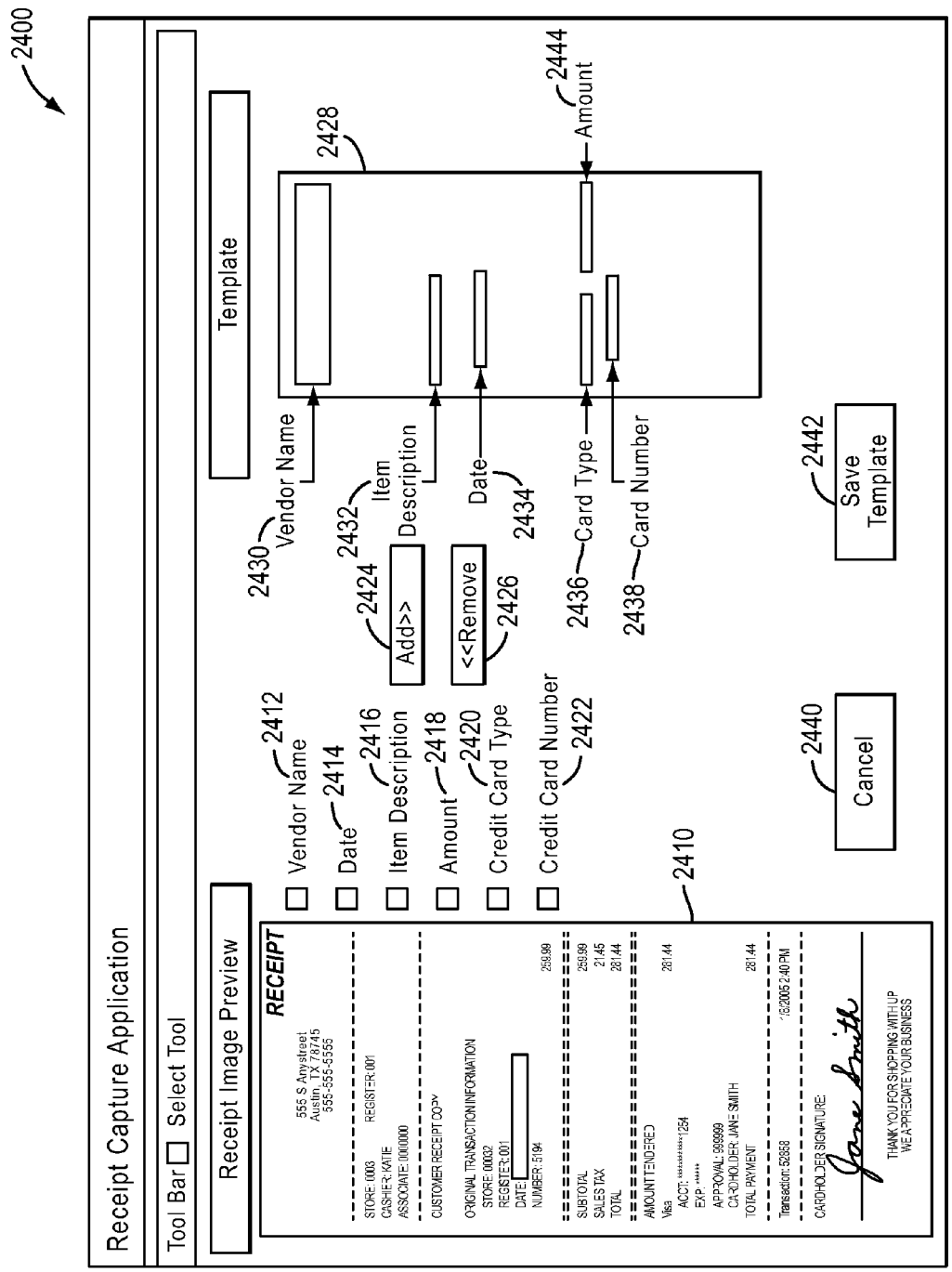
FIG. 24 depicts an embodiment of the user interface in which all of the desired data areas from the receipt image have been located for the user template.
Figure 25:
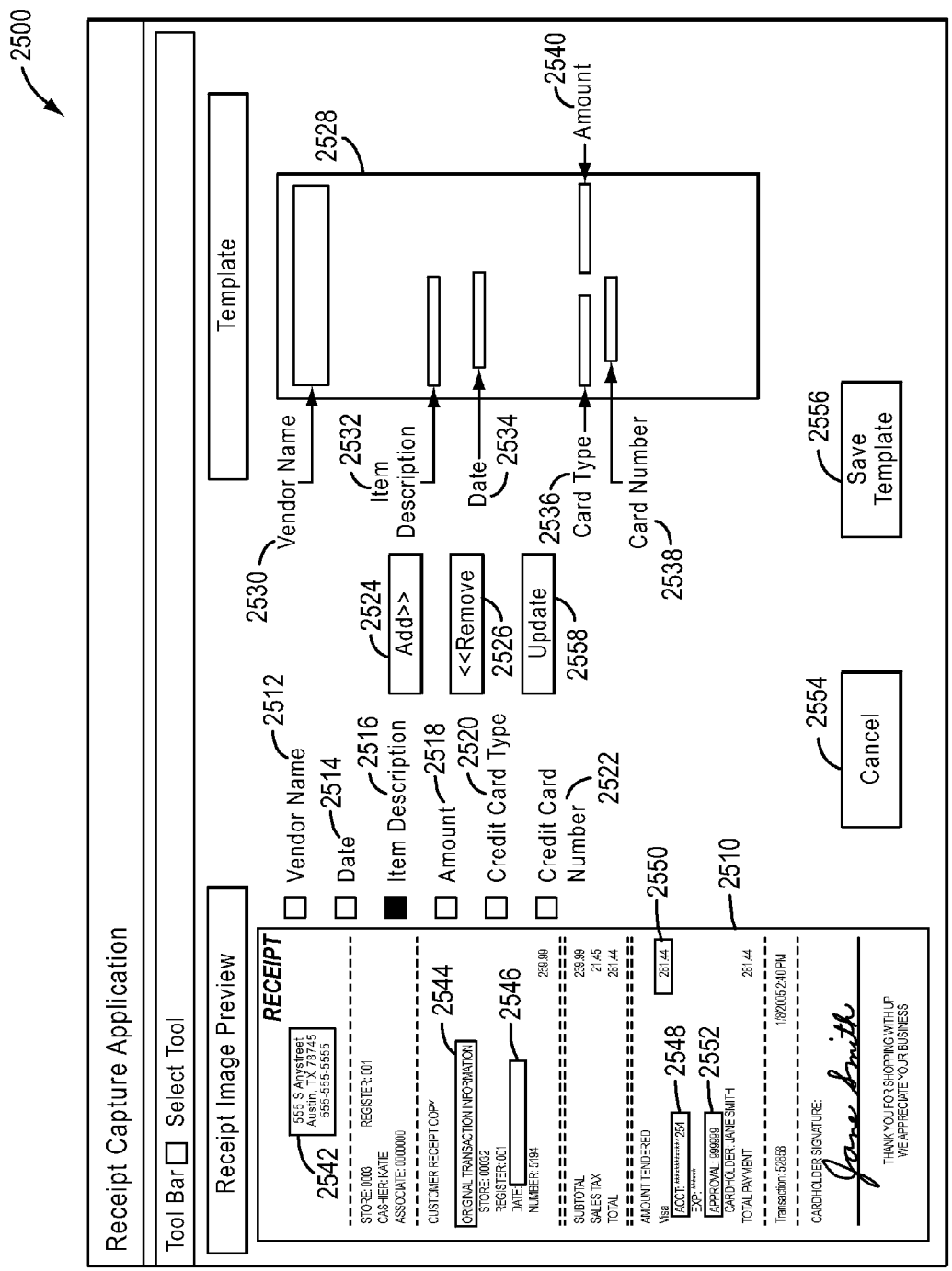
FIG. 25 depicts an embodiment of the user interface for updating an existing template.

FIGS. 19-25 depict a user's interaction with the image capture device. FIG. 19 depicts the preview of the receipt image to determine whether the image should be recaptured. FIG. 20 depicts the review of the template selected by the image processing service. FIGS. 21-24 depict steps in the creation of a new template. FIG. 25 depicts the modification of an existing template.

FIG. 19 depicts an embodiment of the user interface 1900 for the image capture device, which includes a touch screen 1910 through which a user can review receipt images to determine if a new image is needed. The touch screen 1910 displays the receipt image 1912, recapture button 1914, and an upload button 1916. In operation, if the receipt image 1912 appears unclear, the user touches the recapture button 1914 to obtain a new receipt image 1912, which is then displayed on touch screen 1910. If the receipt image 1912 appears acceptable, the user touches the upload button 1916 to continue with the receipt image as displayed. Thus, at this point, the system provides the user with a way of recapturing the image if the image is not sufficiently clear for later processing steps.

FIG. 20 depicts a user interface 2000 touch screen that displays the receipt image 2010 and template data areas 2018, 2020, 2022, 2024, 2026, 2028 according to a selected template 2016 so that the user can review the suitability of the template 2016 for extracting data from the receipt image 2010. If a user determines that the data areas in the template 2016 are correctly positioned for extracting receipt data from the receipt image 2010, then the user touches the confirm button 2014. If the user determines that one or more data are incorrectly positioned, then the user touches the create template button 2012 to create a new template.

Figure 21:
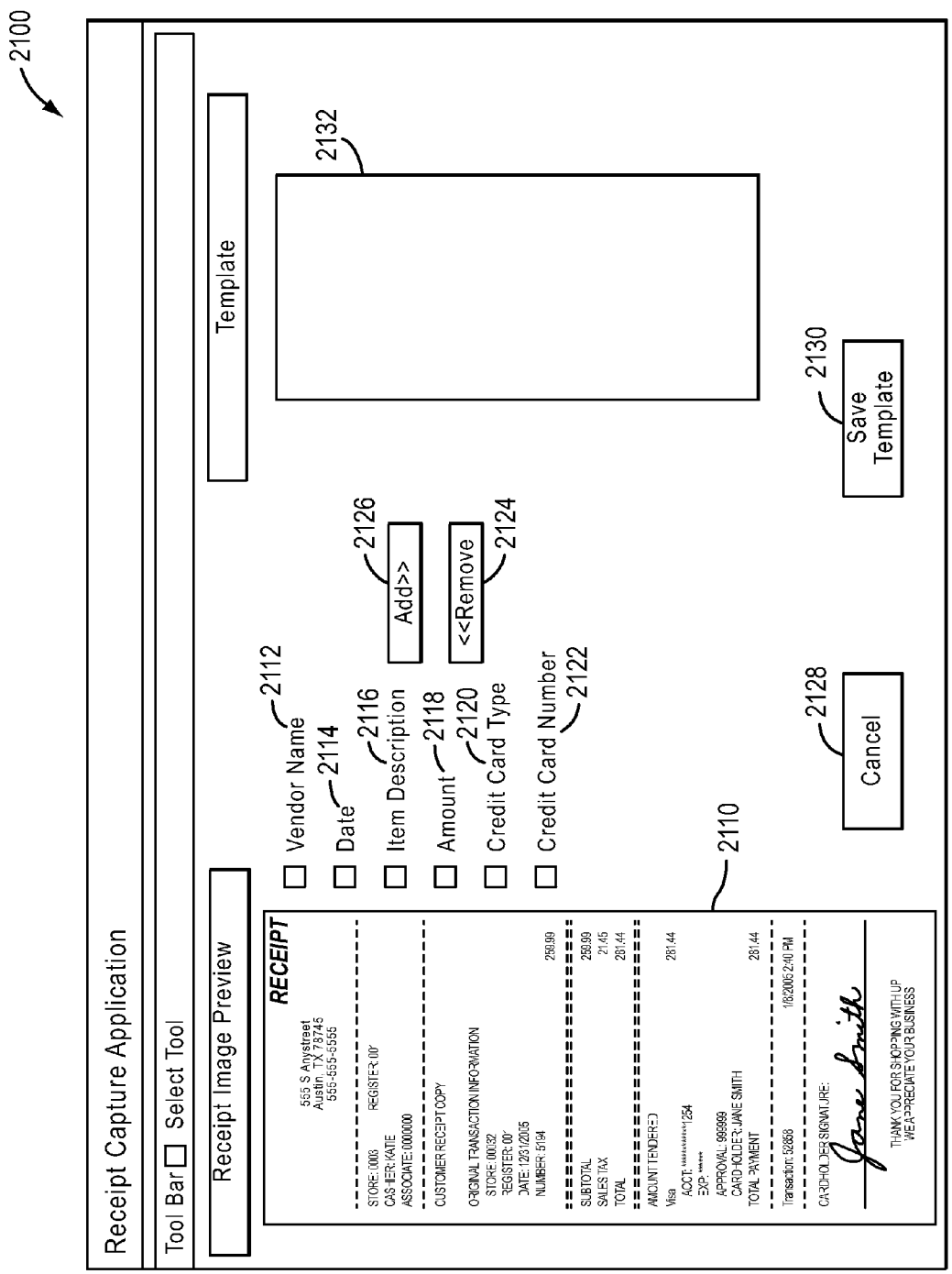
FIG. 21 depicts, in one embodiment, a user interface displaying a first step in creating a new template to guide the data extraction process.

FIG. 21 depicts, in one embodiment, a user interface displaying a first step in creating a new template to guide the data extraction process. The user interface includes the receipt image 2110, a template 2132 that is initially blank, and a number of check boxes 2112, 2114, 2116, 2118, 2120, and 2122. In one embodiment, the template 2132 is obtained from the template data storage. Check boxes 2112, 2114, 2116, 2118, 2120, and 2122 correspond to the data items in the receipt image for which a data area in the template is needed. The user interface screen also includes an add button 2126, a remove button 2124, a cancel button 2128, and a save template button 2130. In operation, for each data area to be included in the template, the user checks the check box corresponding to the data item and then marks an area on the receipt image 2110 for that data item. The user then touches the add button 2126 to add the marked area to the template 2132. If the user makes an error in marking the area for a data item, the user can remove the data area from the template by touching the remove button 2124 and then re-add the area. After the user has located all of the data areas for the template 2132, the user then touches the save template button 2130 to store the new template in the template repository. Optionally, if the user decides to cancel the creation of the new template, the user touches the cancel button 2128.

Figure 22:
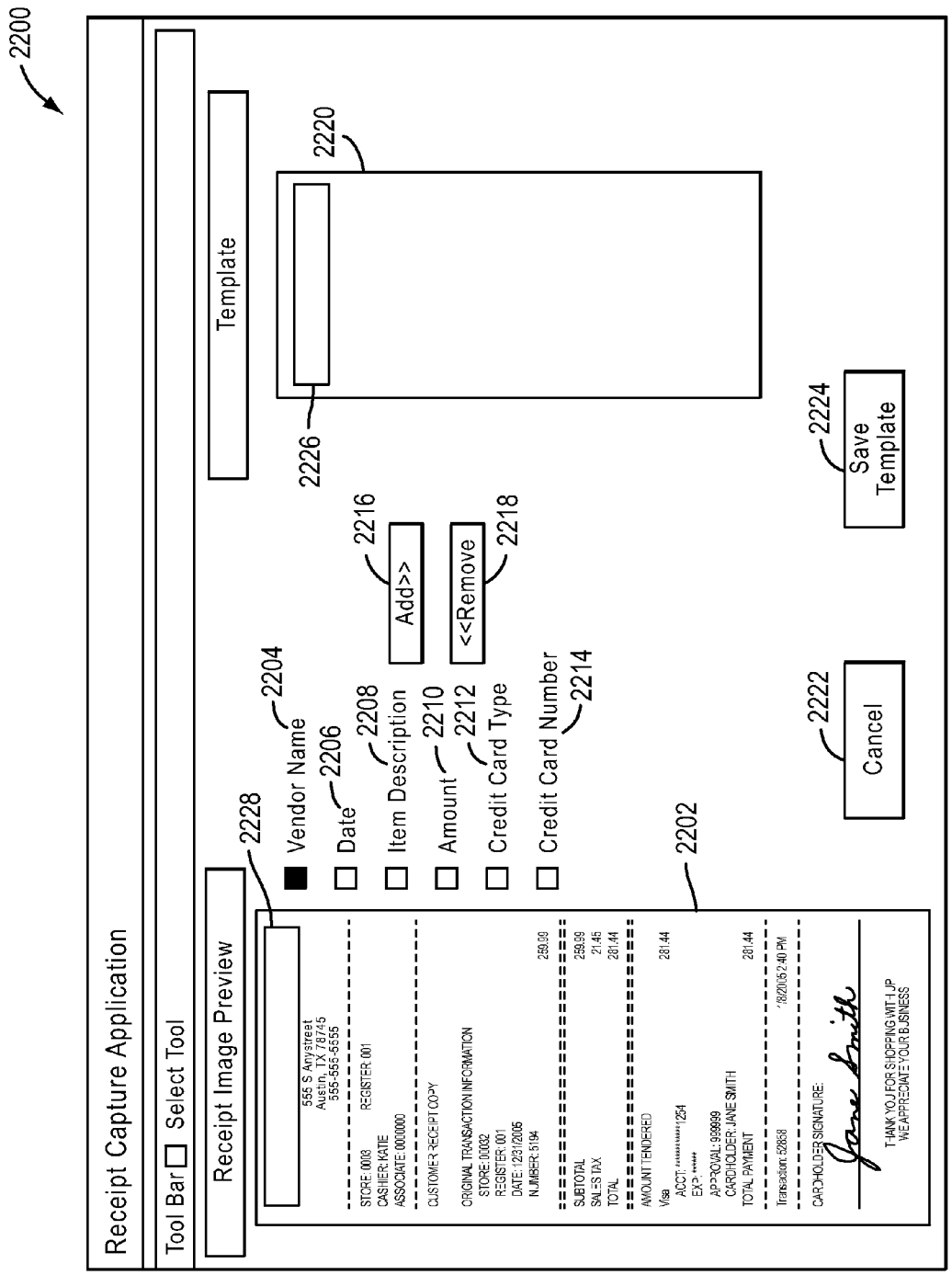
FIG. 22 depicts an embodiment of the user interface for adding a specific data are to the template.

FIG. 22 depicts an embodiment of the user interface 2200 for adding a specific data area to the template 2220. The user interface includes the receipt image 2202, check boxes 2204, 2206, 2208, 2210, 2212, 2214 corresponding to data items on the receipt image 2202. The interface additionally includes add button 2216, remove button 2218, save template button 2224, and cancel button 2222. In operation, the user selects the vendor name check box 2204, which is acknowledged on the screen as a filled-in box, and then marks an area 2228 on the receipt image 2202 corresponding to the vendor name data item. The user then adds the data area 2226 to the template 2220 by touching the add button 2216. If the user makes an error in the location of a data area for the template 2220, the user can remove the data area 2226 from the template and add a new area to the template 2220. After repeating this process for each data area needed on the template 2220, the template 2220 is complete. The user then touches the save template button 2224 to save the completed template in the receipt image template data storage 1716. If the user decides at some point to end the creation of the new template, the user touches the cancel button 2222.

FIG. 23 depicts an embodiment of the user interface 2300 for adding another specific data area to the template 2332, in this example the area for the date. The user interface includes receipt image 2310, check boxes 2312, 2314, 2316, 2318, 2320, 2322, along with add button 2324, remove button 2326, cancel button 2328, and save button 2330. To add the date data area 2338 to the template 2332 the user checks the date check box 2314 and then adjusts the date data area 2338 on the receipt image 2310. After positioning the area 2338 on the receipt image 2310, the user adds the data area 2336 to the template 2332, by touching the add button 2324. The remove button 2326, cancel button 2328 and save template button 2330 operate in manner similar to the corresponding buttons in FIG. 22.

FIG. 24 depicts an embodiment of the user interface in which all of the desired data areas from the receipt image 2410 have been located for the user template 2428. The located data areas include the vendor name 2430, the item description 2432, the transaction date 2434, the card/debit card type 2436, the credit/debit card number 2438, and the transaction amount 2444.

If the user believes that the template 2428 is in good order, then the user touches the save template button 2442 to save the template to the receipt image template data storage 1716. If the user believes that one or more of the data items needs adjustment, then the user selects a check box for the item, removes the item by touching the remove button 2426, provides a new location for the area on the receipt image 2410, and then adds the corresponding area to the template 2428 by touching the add button 2424. If the user decides to end the template creation process, the user touches the cancel button 2440.

FIG. 25 depicts an embodiment of the user interface 2500 for updating an existing template, where the existing template is the selected template or another template selected by the user and residing in the receipt image template data storage 1716. In the embodiment, template areas for vendor name 2530, item description 2532, date 2534, credit/debit card type 2536, credit/debit card number 2538, and amount 2540 have been added to the template 2528. The user determines that the data area for the item description needs adjustment. In one embodiment, the user touches the update button 2558, causing all receipt image data areas 2542, 2544, 2546, 2548, 2550, 2552 to become visible on the receipt image 2510. The user then marks one of the check boxes, in the depicted example, the item description checkbox 2516, which permits the corresponding data area 2546 on the receipt image 2510 to be re-positioned. The user then adjusts the position of the data area 2546 and then touches the add button 2524 to fix the position of the data area 2532 in the template 2528.

Figure 26:
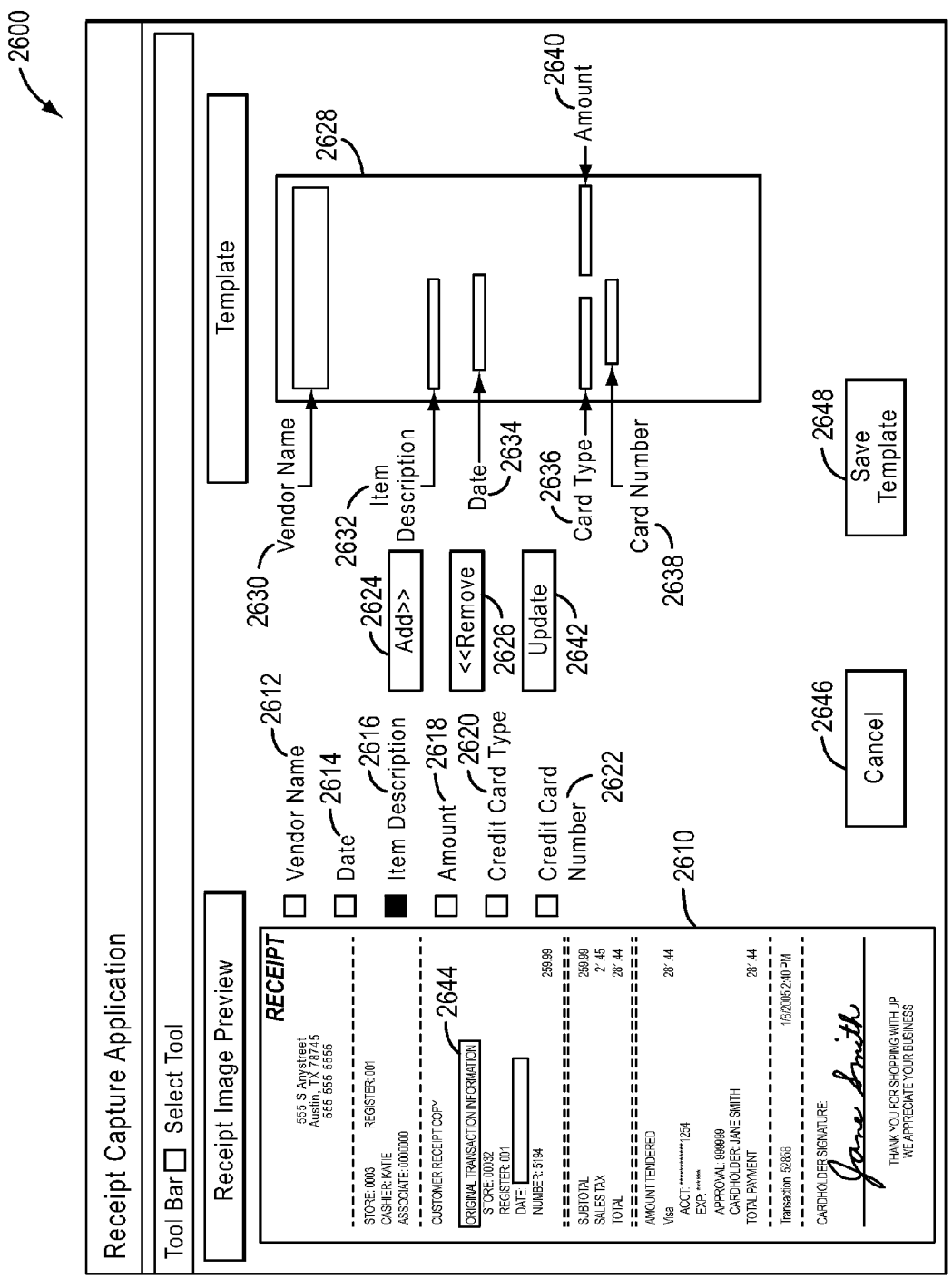
FIG. 26 depicts another embodiment of the user interface for updating an existing template.

In another embodiment of the user interface 2600 depicted in FIG. 26, the user touches the update button 2642 and the touches one of the check boxes, 2612, 2614, 2616, 2618, 2620, 2622, causing one of the corresponding data areas to become visible on the receipt image 2610. In the example illustrated, the user touches the item description check box 2616 to cause the area 2644 to become visible on the receipt image 2610. The user repositions the data area 2644 for the item description and then touches the add button 2624 to fix the corresponding data area 2632 in the template 2628. The user repeats this process until all needed updates are made, after which the user saves the template 2628 using the save template button 2648.

Figure 27:
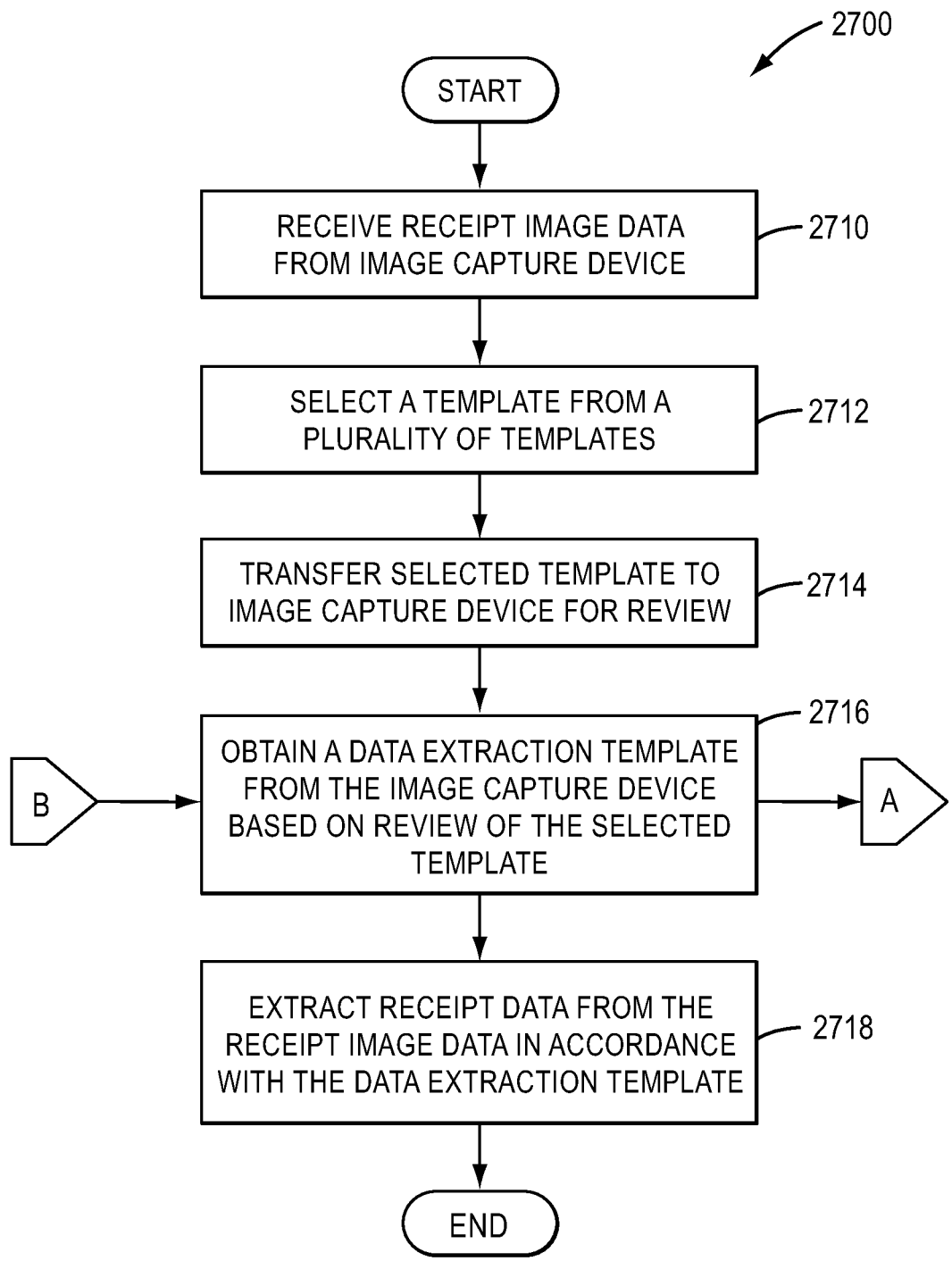
FIG. 27 depicts a flow in accordance with an embodiment.

FIG. 27 depicts a flow 2700 in accordance with an embodiment. In step 2710, receipt image processing services 1700 receives a receipt image from an image capture device 1810. In step 2712, the services 1700 selects a template from the plurality of templates available. In step 2714, the services 1700 transfers the selected template to the image capture device 1810 for review. In step 2716, the services 1700 obtains a data extraction template from the image capture device 1810 based on the review of the selected template. In step 2718, the services 1700 extracts receipt data from the receipt image data in accordance with the data extraction template.

Figure 28:
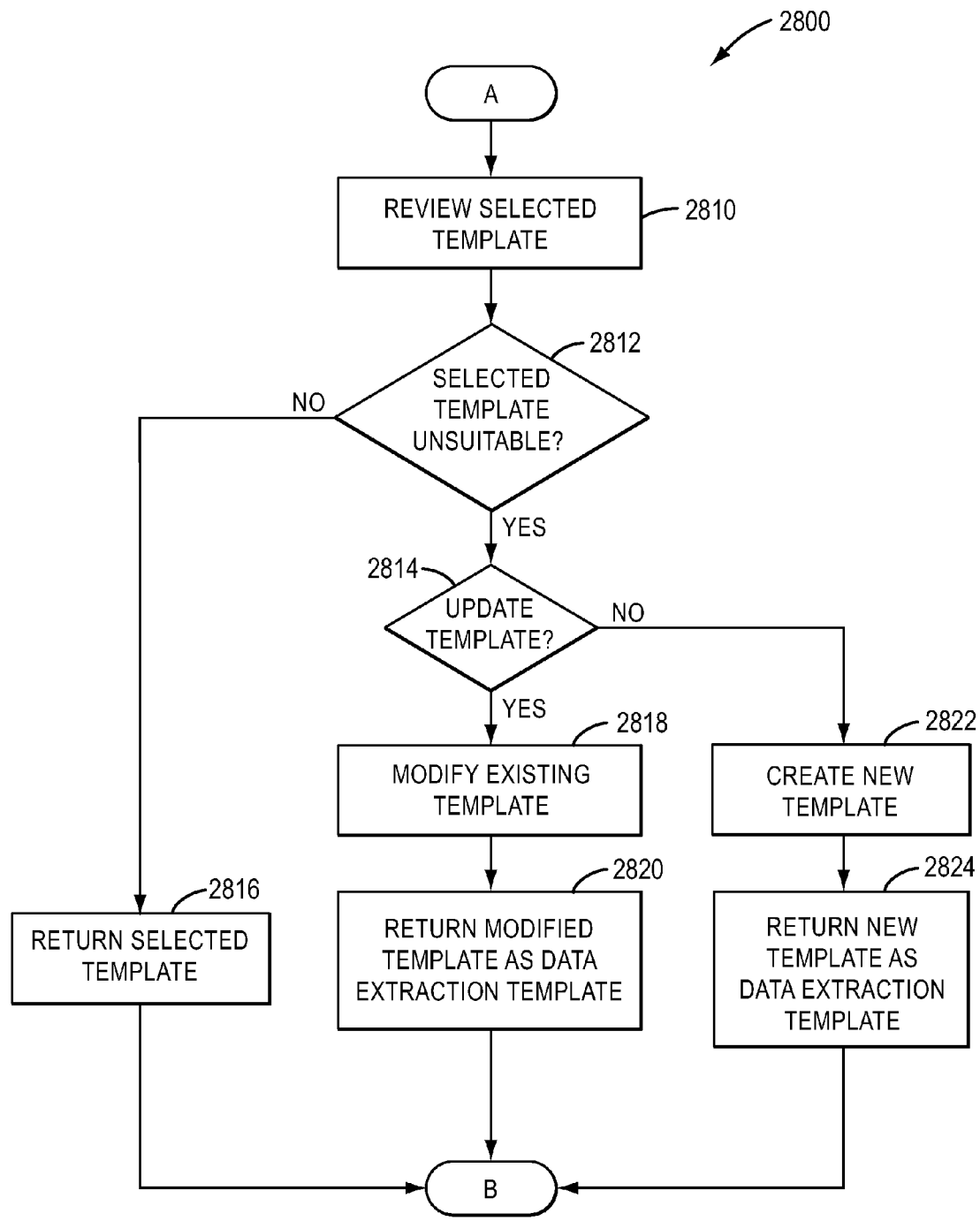
FIG. 28 depicts a flow in accordance with an embodiment.

FIG. 28 depicts a flow 2800 in accordance with an embodiment. In step 2810, the user reviews the selected template. In step 2812, if the template is deemed suitable for data extraction, then the selected template is returned in step 2816. If the template is deemed unsuitable in step 2812, then if the template is to be updated, as determined in step 2814, then the user modifies the template in 2818 by adjusting the data areas and the modified template is returned as the data extraction template in step 2820. If a new template is to be created, as determined in step 2814, then a new template is created from a blank template by adding the needed data areas to the blank template and the new template is returned as the data extraction template in step 2824.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 29:
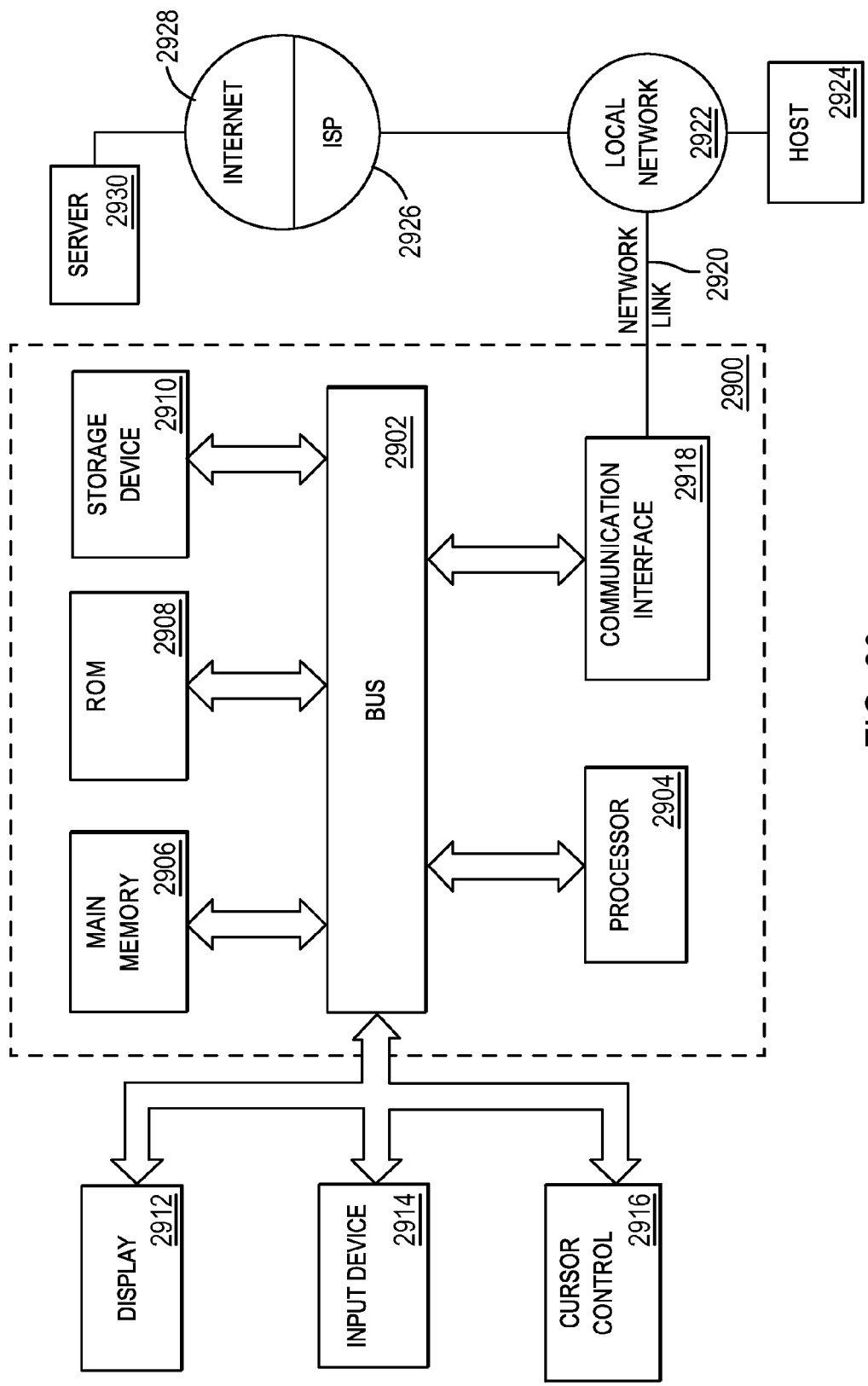
FIG. 29 is a block diagram that depicts a computer system upon which embodiments may be implemented.

For example, FIG. 29 is a block diagram that depicts a computer system 2900 upon which an embodiment may be implemented. Computer system 2900 includes a bus 2902 or other communication mechanism for communicating information, and a hardware processor 2904 coupled with bus 2902 for processing information. Hardware processor 2904 may be, for example, a general-purpose microprocessor.

Computer system 2900 also includes a main memory 2906, such as a random access memory (RAM) or other dynamic storage device, coupled to bus 2902 for storing information and instructions to be executed by processor 2904. Main memory 2906 also may be used for storing temporary variables or other intermediate information during execution of instructions to be executed by processor 2904. Such instructions, when stored in non-transitory storage media accessible to processor 2904, convert computer system 2900 into a special-purpose machine that is customized to perform the operations specified in the instructions.

Computer system 2900 further includes a read only memory (ROM) 2908 or other static storage device coupled to bus 2902 for storing static information and instructions for processor 2904. A storage device 2910, such as a magnetic disk or optical disk, is provided and coupled to bus 2902 for storing information and instructions.

Computer system 2900 may be coupled via bus 2902 to a display 2912, such as a cathode ray tube (CRT), for displaying information to a computer user. An input device 2914, including alphanumeric and other keys, is coupled to bus 2902 for communicating information and command selections to processor 2904. Another type of user input device is cursor control 2916, such as a mouse, a trackball, or cursor direction keys for communicating direction information and command selections to processor 2904 and for controlling cursor movement on display 2912. This input device typically has two degrees of freedom in two axes, a first axis (e.g., x) and a second axis (e.g., y), that allows the device to specify positions in a plane.

Computer system 2900 may implement the techniques described herein using customized hard-wired logic, one or more ASICs or FPGAs, firmware and/or program logic which in combination with the computer system causes or programs computer system 2900 to be a special-purpose machine. According to one embodiment, the techniques herein are performed by computer system 2900 in response to processor 2904 executing one or more sequences of one or more instructions contained in main memory 2906. Such instructions may be read into main memory 2906 from another storage medium, such as storage device 2910. Execution of the sequences of instructions contained in main memory 2906 causes processor 2904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2910. Volatile media includes dynamic memory, such as main memory 2906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2902. Transmission media can also take the form of acoustic or light waves, such as those generated during radio-wave and infra-red data communications.

Various forms of media may be involved in carrying one or more sequences of one or more instructions to processor 2904 for execution. For example, the instructions may initially be carried on a magnetic disk or solid-state drive of a remote computer. The remote computer can load the instructions into its dynamic memory and send the instructions over a telephone line using a modem. A modem local to computer system 2900 can receive the data on the telephone line and use an infra-red transmitter to convert the data to an infra-red signal. An infra-red detector can receive the data carried in the infra-red signal and appropriate circuitry can place the data on bus 2902. Bus 2902 carries the data to main memory 2906, from which processor 2904 retrieves and executes the instructions. The instructions received by main memory 2906 may optionally be stored on storage device 2910 either before or after execution by processor 2904.

Computer system 2900 also includes a communication interface 2918 coupled to bus 2902. Communication interface 2918 provides a two-way data communication coupling to a network link 2920 that is connected to a local network 2922. For example, communication interface 2918 may be an integrated services digital network (ISDN) card, cable modem, satellite modem, or a modem to provide a data communication connection to a corresponding type of telephone line. As another example, communication interface 2918 may be a local area network (LAN) card to provide a data communication connection to a compatible LAN. Wireless links may also be implemented. In any such implementation, communication interface 2918 sends and receives electrical, electromagnetic or optical signals that carry digital data streams representing various types of information.

Network link 2920 typically provides data communication through one or more networks to other data devices. For example, network link 2920 may provide a connection through local network 2922 to a host computer 2924 or to data equipment operated by an Internet Service Provider (ISP) 2926. ISP 2926 in turn provides data communication services through the world wide packet data communication network now commonly referred to as the "Internet" 2928. Local network 2922 and Internet 2928 both use electrical, electromagnetic or optical signals that carry digital data streams. The signals through the various networks and the signals on network link 2920 and through communication interface 2918, which carry the digital data to and from computer system 2900, are example forms of transmission media.

Computer system 2900 can send messages and receive data, including program code, through the network(s), network link 2920 and communication interface 2918. In the Internet example, a server 2930 might transmit a requested code for an application program through Internet 2928, ISP 2926, local network 2922 and communication interface 2918.

The received code may be executed by processor 2904 as it is received, and/or stored in storage device 2910, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the embodiments, and what is intended by the applicants to be the scope of embodiments, is the literal and equivalent scope of the set of claims that issue from this application, in the specific form in which such claims issue, including any subsequent correction.

What is claimed is:

1. A non-transitory computer readable medium storing instructions for capture of image data, wherein processing the instructions by one or more processors causes:

receiving receipt image data from an image capture device, the receipt image data having a particular layout of data items;

processing the receipt image data received from the image capture device to determine locations of the data items in the particular layout;

for each respective image template of a plurality of image templates, comparing, by an OCR engine, the locations of the data items in the particular layout of the receipt image data with locations of a plurality of data areas defined by the respective image template;

based on comparing the locations of the data items in the particular layout of the receipt image data with locations of data areas defined by the respective image template for each respective image template of the plurality of image templates, selecting by the OCR engine, an image template from the plurality of image templates based on an accuracy value that indicates a matching accuracy between an image template layout of the plurality of data areas and the particular layout of data items in the receipt image data, wherein a particular location for each respective data area of the plurality of data areas in the selected image template corresponds to a respective location of one or more data items in the receipt image data, wherein the selected image template identifies a particular label for each respective data area of the plurality of data areas;

transferring the selected image template to the image capture device for review by a user;

obtaining a final image template based on the review of the selected image template; and extracting receipt data from the receipt image data in accordance with the final image template.

2. The non-transitory computer readable medium of claim 1, wherein the final image template is the selected image template.

3. The non-transitory computer readable medium of claim 1, wherein the final image template is a image template selected from the plurality of image templates that has been updated by the user.

4. The non-transitory computer readable medium of claim 3,
wherein the image capture device includes a touch screen; and
wherein the updated template is obtained by:
presenting the receipt image and the selected image template on the image capture device to a user; and
receiving markings from the user via the touch screen of one or more areas on the receipt image to be updated and fixing the one or more areas on the selected image template to form the updated template.

5. The non-transitory computer readable medium of claim 1, wherein the final image template is an image template selected by the user from the plurality of image templates.

6. The non-transitory computer readable medium of claim 1, wherein obtaining the final image template based on the review of the selected image template comprises:
receiving, from the image capture device, a set of one or more changes to the selected image template;
wherein the set of one or more changes to the selected image template include at least one of: an addition of a data area to the selected image template; a repositioning of a particular data area within the selected image template, or a deletion of a particular data area of the plurality of data areas from the selected image template.

7. The non-transitory computer readable medium of claim 1,
wherein the image capture device includes a touch screen; and
wherein obtaining a final image template comprises obtaining a new image template by:
presenting the receipt image and a blank image template to the touch screen on the image capture device, and
receiving a new image template from the image capture device that includes one or more data areas, added via the touch screen, to the blank image template.

8. The non-transitory computer readable medium of claim 1, wherein the locations of one or more data areas in the selected image template are the same as the locations of the corresponding data items in the receipt image.

9. A receipt image processing system comprising:
one or more processors;
one or more memories storing a plurality of receipt image templates; and
an OCR engine for extracting receipt data from receipt image data, the OCR engine being configured to:
receive receipt image data from an image capture device, the receipt image data having a particular layout of data items;
process the receipt image data received from the image capture device to determine locations of the data items in the particular layout;
for each respective receipt image template of the plurality of receipt image templates, comparing the locations of the data items in the particular layout of the receipt image data with locations of a plurality of data areas defined by the respective receipt image template;
based on comparing the locations of the data items in the particular layout of the receipt image data with locations of data areas defined by the respective image template for each respective image template of the plurality of image templates, selecting an image template from the plurality of image templates based on an accuracy value that indicates a matching accuracy between an image template layout of the plurality of data areas and the particular layout of data items in the receipt image data, wherein a particular location for each respective data area of the plurality of data areas in the selected image template corresponds to a respective location of one or more data items in the receipt image data, wherein the selected image template identifies a particular label for each respective data area of the plurality of data areas;
obtain a final receipt image template from the image capture device based on a review of the selected receipt image template, and
extract receipt data from the receipt image data based on the final receipt image template, wherein the final receipt image template is either a receipt image template selected from the data storage, an updated template, or a new template.

10. The receipt image processing system as recited in claim 9,
wherein the image capture device includes a touch screen; and
wherein the updated template is obtained by:
presenting to the touch screen of the image capture device the receipt image and the selected receipt image template, and
receiving an updated template that includes one or more data areas, readjusted via the touch screen, on the selected receipt image template.

11. The receipt image processing system as recited in claim 10, wherein the final receipt image template is selected by the user from the data storage.

12. The receipt image processing system as recited in claim 9,
wherein the image capture device includes a touch screen; and
wherein the OCR engine is further configured to:
transfer the receipt image and a blank template to the touch screen of the image capture device, and
receive the new template from the image capture device, wherein the new template includes one or more data areas, added via the touch screen, to the blank template.

13. The receipt image processing system as recited in claim 9, wherein the new template is stored in data storage.

14. A method for capture of image data, the method comprising:
receiving receipt image data from an image capture device, the receipt image data having a particular layout of data items;
processing the receipt image data received from the image capture device to determine locations of the data items in the particular layout;
for each respective image template of a plurality of image templates, comparing, by an OCR engine, the locations of the data items in the particular layout of the receipt image data with locations of a plurality of data areas defined by the respective image template;
based on comparing the locations of the data items in the particular layout of the receipt image data with locations of data areas defined by the respective image template for each respective image template of the plurality of image templates, selecting by the OCR engine, an image template from the plurality of image templates based on an accuracy value that indicates a matching accuracy between an image template layout of the plurality of data areas and the particular layout of data items in the receipt image data, wherein a particular location for each respective data area of the plurality of data areas in the selected image template corresponds to a respective location of one or more data items in the receipt image data, wherein the selected image template identifies a particular label for each respective data area of the plurality of data areas;
transferring the selected image template to the image capture device for review by a user;
obtaining a final image template based on the review of the selected image template; and
extracting receipt data from the receipt image data in accordance with the final image template.

15. The method for capture as recited in claim 14, wherein the final image template is the selected image template.

16. The method for capture as recited in claim 14, wherein the final image template is a image template selected from the plurality of image templates and updated.

17. The method for capture as recited in claim 16,
wherein the image capture device includes a touch screen; and
wherein the updated template is obtained by:
presenting the receipt image and the selected image template on the image capture device to a user; and
receiving markings from the user via the touch screen of one or more areas on the receipt image to be updated and fixing the one or more areas on the selected image template to form the updated template.

18. The method for capture as recited in claim 14, wherein the final image template is an image template selected by the user from the plurality of image templates.

19. The method for capture as recited in claim 14, wherein obtaining the final image template based on the review of the selected image template comprises:
receiving, from the image capture device, a set of one or more changes to the selected image template;
wherein the set of one or more changes to the selected image template include at least one of: an addition of a data area to the selected image template; a repositioning of particular data area within the selected image template, or a deletion of a particular data area of the plurality of data areas from the selected image template.

20. The method for capture as recited in claim 14,
wherein the image capture device includes a touch screen; and
wherein obtaining a final image template comprises obtaining a new image template by:
presenting the receipt image and a blank image template to the touch screen on the image capture device, and
receiving a new image template from the image capture device that includes one or more data areas, added via the touch screen, to the blank image template.

* * * * *